(12) United States Patent
Mukae

(10) Patent No.: US 12,227,309 B2
(45) Date of Patent: Feb. 18, 2025

(54) METHOD FOR FORMING UNIFIED SATELLITE CONSTELLATION, UNIFIED DATA LIBRARY, AND UNIFIED SATELLITE CONSTELLATION

(71) Applicant: Mitsubishi Electric Corporation, Tokyo (JP)

(72) Inventor: Hisayuki Mukae, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 6 days.

(21) Appl. No.: 18/274,732

(22) PCT Filed: Feb. 16, 2022

(86) PCT No.: PCT/JP2022/006105
§ 371 (c)(1),
(2) Date: Jul. 28, 2023

(87) PCT Pub. No.: WO2022/176893
PCT Pub. Date: Aug. 25, 2022

(65) Prior Publication Data
US 2024/0308696 A1 Sep. 19, 2024

(30) Foreign Application Priority Data
Feb. 19, 2021 (JP) .................. 2021-024772

(51) Int. Cl.
*B64G 1/10* (2006.01)
*B64G 1/24* (2006.01)
*H04B 7/185* (2006.01)

(52) U.S. Cl.
CPC ......... *B64G 1/1085* (2013.01); *B64G 1/1007* (2013.01); *B64G 1/1021* (2013.01); *B64G 1/242* (2013.01); *H04B 7/18521* (2013.01)

(58) Field of Classification Search
CPC .. B64G 1/1085; B64G 1/1007; B64G 1/1021; B64G 1/242; B64G 1/10; B64G 1/66;
(Continued)

(56) References Cited

U.S. PATENT DOCUMENTS 3,017,777 A * 1/1962 Haeussermann ...... B64G 1/283
244/1 R
3,815,140 A * 6/1974 Buehler ............... H01Q 25/007
342/414
(Continued)

FOREIGN PATENT DOCUMENTS

JP 2008-137439 A 6/2008

OTHER PUBLICATIONS

International Search Report mailed on Apr. 5, 2022, received for PCT Application PCT/JP2022/006105, filed on Feb. 16, 2022, 8 pages including English Translation.

*Primary Examiner* — Medhat Badawi
(74) *Attorney, Agent, or Firm* — XSENSUS LLP

(57) ABSTRACT

There is provided a method for detecting flying object launching using a surveillance system and a communication system and transmitting flying object information to a coping system in quasi-real time.
A plurality of satellite constellation business apparatuses (430) which manage individual satellite constellations, each having eight or more communication satellites (200) on one orbital plane (90), are present. All of the individual satellite constellations form a satellite constellation (610) which is a unified satellite constellation with eight or more orbital planes. Communication satellites (200) on a same orbital plane each form cross-links with communication satellites ahead and behind. Communication satellites on adjacent orbital planes each form cross-links with communication satellites in left and right adjacent orbits. The plurality of satellite constellation business apparatuses (430) construct a
(Continued)

total of N orbital planes (90) and form a mesh communication network in collaboration.

29 Claims, 23 Drawing Sheets

(58) Field of Classification Search
CPC .. B64G 3/00; H04B 7/18521; H04B 7/18513; H04B 7/195; F41H 11/02
See application file for complete search history.

(56) References Cited

U.S. PATENT DOCUMENTS

| | | | | |
|---|---|---|---|---|
| 4,218,654 A * | 8/1980 | Ogawa | H04B 7/0845 | 370/324 |
| 4,691,882 A * | 9/1987 | Young | H04B 7/18521 | 455/13.1 |
| 4,937,822 A * | 6/1990 | Weddle | H04J 13/00 | 455/62 |
| 4,965,850 A * | 10/1990 | Schloemer | H04W 16/10 | 455/452.2 |
| 4,968,981 A * | 11/1990 | Sekine | G01S 19/30 | 375/150 |
| 4,985,706 A * | 1/1991 | Schukat | H04L 23/02 | 244/1 R |
| 5,274,840 A * | 12/1993 | Schwendeman | H04B 7/18521 | 455/13.1 |
| 5,303,286 A * | 4/1994 | Wiedeman | H04B 7/18556 | 370/335 |
| 5,410,728 A * | 4/1995 | Bertiger | H04B 7/18521 | 455/13.1 |
| 5,433,726 A * | 7/1995 | Horstein | B64G 1/242 | 455/12.1 |
| 5,551,624 A * | 9/1996 | Horstein | B64G 1/1085 | 342/356 |
| 5,561,836 A * | 10/1996 | Sowles | H04B 7/18545 | 342/357.43 |
| 5,566,354 A * | 10/1996 | Sehloemer | H04B 7/18539 | 455/13.1 |
| 5,574,968 A * | 11/1996 | Olds | H04B 7/18541 | 455/436 |
| 5,592,175 A * | 1/1997 | Tayloe | G01S 5/12 | 455/12.1 |
| 5,604,920 A * | 2/1997 | Bertiger | H04B 7/18521 | 455/13.1 |
| 5,642,355 A * | 6/1997 | Smith | H04B 7/2656 | 455/450 |
| 5,716,029 A * | 2/1998 | Spitzer | B64G 1/413 | 244/171.5 |
| 5,722,042 A * | 2/1998 | Kimura | H04B 7/195 | 455/13.1 |
| 5,757,784 A * | 5/1998 | Liebowitz | H04B 7/18578 | 379/114.07 |
| 5,793,842 A * | 8/1998 | Schloemer | H04W 40/10 | 370/332 |
| 5,812,545 A * | 9/1998 | Liebowitz | H04B 7/18582 | 370/444 |
| 5,813,634 A * | 9/1998 | Pizzicaroli | H04B 7/18519 | 455/12.1 |
| 5,841,766 A * | 11/1998 | Dent | H04B 7/18534 | 370/321 |
| 5,887,257 A * | 3/1999 | Olds | H04B 7/195 | 455/12.1 |
| 5,907,541 A * | 5/1999 | Fairholm | H04B 7/18563 | 370/321 |
| 5,943,324 A * | 8/1999 | Ramesh | H04B 7/18558 | 370/545 |
| 5,957,409 A * | 9/1999 | Castiel | H04B 7/18576 | 455/12.1 |
| 5,959,999 A * | 9/1999 | An | H04B 7/2123 | 370/442 |
| 5,971,324 A * | 10/1999 | Williams | H04B 7/195 | 342/356 |
| 5,991,598 A * | 11/1999 | Nawata | H04B 7/2125 | 455/430 |
| 6,008,758 A * | 12/1999 | Campbell | H04B 7/208 | 455/12.1 |
| 6,011,951 A * | 1/2000 | King | H04B 7/195 | 455/13.2 |
| 6,023,605 A * | 2/2000 | Sasaki | H04B 7/195 | 455/430 |
| 6,031,826 A * | 2/2000 | Hassan | H04L 1/0072 | 370/321 |
| 6,084,865 A * | 7/2000 | Dent | H04W 52/283 | 370/321 |
| 6,101,177 A * | 8/2000 | Bodin | H04W 16/26 | 370/336 |
| 6,157,621 A * | 12/2000 | Brown | H01Q 25/008 | 370/310 |
| 6,208,312 B1* | 3/2001 | Gould | H01Q 5/45 | 343/835 |
| 6,219,003 B1* | 4/2001 | Chandler | H01Q 15/148 | 343/912 |
| 6,219,617 B1* | 4/2001 | Dreischer | G01S 5/0081 | 455/12.1 |
| 6,295,283 B1* | 9/2001 | Falk | H04Q 11/0421 | 370/395.6 |
| 6,327,523 B2* | 12/2001 | Cellier | H04B 7/195 | 701/13 |
| 6,404,769 B1* | 6/2002 | Kapoor | H04B 7/18584 | 342/353 |
| 6,453,236 B1* | 9/2002 | Aoki | G01C 21/36 | 701/454 |
| 6,459,899 B1* | 10/2002 | Schloemer | H04W 24/08 | 455/445 |
| 6,493,322 B1* | 12/2002 | Chennakeshu | H04B 7/18534 | 370/336 |
| 6,553,225 B1* | 4/2003 | Zhao | H04B 7/2041 | 455/430 |
| 6,556,828 B1* | 4/2003 | Carlin | H04B 7/19 | 455/12.1 |
| 6,606,309 B1* | 8/2003 | Wang | H04W 74/0866 | 370/522 |
| 6,655,637 B1* | 12/2003 | Robinson | B64G 1/2427 | 244/172.4 |
| 6,684,056 B1* | 1/2004 | Emmons, Jr. | H04B 7/19 | 455/430 |
| 6,725,012 B1* | 4/2004 | Janson | B64G 1/1007 | 244/158.6 |
| 6,766,987 B2* | 7/2004 | Taormina | H04B 7/195 | 701/531 |
| 6,775,251 B1* | 8/2004 | Wiedeman | H04B 7/18558 | 455/12.1 |
| 6,816,682 B1* | 11/2004 | Ionov | H04B 10/118 | 398/124 |
| 6,823,170 B1* | 11/2004 | Dent | H04B 7/18515 | 455/430 |
| 6,950,060 B1* | 9/2005 | Klein | B64G 1/242 | 455/12.1 |
| 6,985,454 B1* | 1/2006 | Wiedeman | H04B 7/18589 | 370/316 |
| 7,184,761 B1* | 2/2007 | Wang | H04B 7/195 | 455/430 |
| 7,255,308 B1* | 8/2007 | Murphy | B64G 1/1085 | 244/158.4 |
| 7,257,371 B1* | 8/2007 | Bettinger | H04B 7/18513 | 455/430 |
| 7,258,305 B1* | 8/2007 | Murphy | B64G 1/1085 | 244/158.4 |
| 7,270,299 B1* | 9/2007 | Murphy | B64G 1/1085 | 244/158.4 |
| 7,292,186 B2* | 11/2007 | Miller | G01S 19/54 | 375/355 |
| 7,358,899 B1* | 4/2008 | Ville | G01S 11/02 | 342/458 |
| 7,366,463 B1* | 4/2008 | Archer | H04B 7/18563 | 455/12.1 |

(56) References Cited

U.S. PATENT DOCUMENTS

| | | | | |
|---|---|---|---|---|
| 7,369,809 B1* | 5/2008 | Wang | H04B 7/18521 | 455/430 |
| 7,370,566 B2* | 5/2008 | Furman | B64G 1/1085 | 370/316 |
| 7,454,272 B1* | 11/2008 | Burgess | B64G 1/242 | 342/356 |
| 7,471,720 B2* | 12/2008 | Ram | H04B 7/18528 | 375/211 |
| 7,502,382 B1* | 3/2009 | Liu | H04B 7/18584 | 455/12.1 |
| 7,515,566 B2* | 4/2009 | Dale | H04H 20/74 | 455/430 |
| 7,574,224 B2* | 8/2009 | Lane | H04W 56/0005 | 455/208 |
| 7,792,488 B2* | 9/2010 | Karabinis | H04B 7/2041 | 455/448 |
| 7,831,202 B2* | 11/2010 | Karabinis | H04B 7/18521 | 343/705 |
| 7,925,167 B1* | 4/2011 | Kozubal | H04B 7/18513 | 398/118 |
| 8,078,101 B2* | 12/2011 | Karabinis | H04B 7/216 | 455/430 |
| 8,090,312 B2* | 1/2012 | Robinson | H04B 7/18519 | 455/12.1 |
| 8,538,327 B2* | 9/2013 | Sayeed | H04B 7/18589 | 455/12.1 |
| 8,634,414 B2* | 1/2014 | Leong | H04B 7/18515 | 370/389 |
| 8,665,771 B2* | 3/2014 | Nam | H04B 7/18539 | 370/312 |
| 8,712,321 B1* | 4/2014 | Dankberg | H04B 7/2041 | 455/12.1 |
| 8,816,933 B2* | 8/2014 | Scott | H01Q 3/04 | 343/757 |
| 8,918,047 B1* | 12/2014 | Teller | H04B 7/18513 | 455/427 |
| 9,035,839 B2* | 5/2015 | Scott | H01Q 25/007 | 343/915 |
| 9,042,408 B2* | 5/2015 | Gaal | H04J 11/0036 | 370/468 |
| 9,184,629 B2* | 11/2015 | Johnson | G06F 1/3231 | |
| 9,220,047 B2* | 12/2015 | Furukawa | H04W 40/06 | |
| 9,628,956 B1* | 4/2017 | Kim | H04W 4/023 | |
| 9,647,749 B2* | 5/2017 | Krebs | H04B 7/19 | |
| 9,651,946 B1* | 5/2017 | Rubel | B64G 1/1021 | |
| 9,748,989 B1* | 8/2017 | Freedman | H04B 1/12 | |
| 9,788,306 B2* | 10/2017 | Chen | H04W 72/21 | |
| 9,900,856 B2* | 2/2018 | Wu | H04B 7/01 | |
| 9,929,796 B2* | 3/2018 | Renouard | H04B 7/18521 | |
| 9,954,601 B2* | 4/2018 | Buer | H04B 7/18534 | |
| 9,973,266 B1* | 5/2018 | Avellan | H04B 7/024 | |
| 10,063,309 B2* | 8/2018 | Laufer | H04B 7/18536 | |
| 10,084,535 B1* | 9/2018 | Speidel | H04B 7/18532 | |
| 10,084,536 B1* | 9/2018 | Schloemer | H04B 7/1856 | |
| 10,084,615 B2* | 9/2018 | Hong | H04W 72/20 | |
| 10,085,200 B1* | 9/2018 | Schloemer | H04W 40/24 | |
| 10,291,316 B1* | 5/2019 | Schloemer | H04B 7/18556 | |
| 10,361,773 B2* | 7/2019 | Vaughan | H04B 7/19 | |
| 10,574,341 B1* | 2/2020 | Liang | H04W 72/0453 | |
| 10,715,245 B2* | 7/2020 | Nobbe | H04B 7/18534 | |
| 10,742,311 B2* | 8/2020 | Speidel | H04B 7/18521 | |
| 10,770,790 B1* | 9/2020 | Mahanfar | H01Q 3/34 | |
| 10,979,136 B2* | 4/2021 | Schloemer | H04B 7/18526 | |
| 11,101,876 B2* | 8/2021 | Kargieman | H04N 7/183 | |
| 11,206,079 B2* | 12/2021 | Schloemer | H04B 7/18556 | |
| 11,522,604 B2* | 12/2022 | Speidel | H04B 7/18515 | |
| 11,595,114 B2* | 2/2023 | Speidel | H04B 7/18532 | |
| 11,606,138 B1* | 3/2023 | Speidel | H04B 7/18513 | |
| 11,637,628 B2* | 4/2023 | Greenidge | H04B 7/18519 | 370/316 |
| 11,820,535 B2* | 11/2023 | Turner | B64G 1/1085 | |
| 11,832,160 B2* | 11/2023 | Schloemer | H04B 7/18515 | |
| 11,838,097 B2* | 12/2023 | Bournes | H04B 10/118 | |
| 11,855,745 B2* | 12/2023 | Schloemer | H04W 40/12 | |
| 11,863,250 B2* | 1/2024 | Speidel | H01Q 3/26 | |
| 11,870,543 B2* | 1/2024 | Schloemer | H04L 1/0045 | |
| 11,876,602 B2* | 1/2024 | Qiao | H04W 72/12 | |
| 11,878,817 B2* | 1/2024 | Mukae | B64G 1/1007 | |
| 11,968,023 B2* | 4/2024 | Schloemer | H04W 16/28 | |
| 11,968,036 B2* | 4/2024 | Mukae | B64G 1/10 | |
| 12,040,880 B2* | 7/2024 | Speidel | H04W 4/02 | |
| 12,043,417 B2* | 7/2024 | Mukae | B64G 1/244 | |
| 12,063,101 B2* | 8/2024 | Schloemer | H04B 7/18521 | |
| 12,074,686 B2* | 8/2024 | Schloemer | H04B 7/18521 | |
| 12,103,711 B2* | 10/2024 | Mukae | B64G 1/244 | |
| 12,151,833 B2* | 11/2024 | Mukae | B64G 3/00 | |
| 2001/0022779 A1* | 9/2001 | Wheatley, III | H04B 1/7075 | 375/E1.003 |
| 2001/0045494 A1* | 11/2001 | Higgins | H04B 7/195 | 244/158.4 |
| 2002/0057745 A1* | 5/2002 | Friedman | H04B 7/18515 | 375/295 |
| 2002/0060995 A1* | 5/2002 | Cervello | H04W 72/02 | 370/332 |
| 2002/0135510 A1* | 9/2002 | Bruno | G01S 19/05 | 701/470 |
| 2002/0136191 A1* | 9/2002 | Draim | H04B 7/195 | 370/344 |
| 2002/0151273 A1* | 10/2002 | Marko | H04B 7/195 | 455/12.1 |
| 2002/0164986 A1* | 11/2002 | Briand | H04B 7/2659 | 455/442 |
| 2002/0177403 A1* | 11/2002 | LaPrade | H04B 7/195 | 455/12.1 |
| 2003/0028339 A1* | 2/2003 | Caso | H03M 1/1014 | 702/90 |
| 2003/0040852 A1* | 2/2003 | Green | G01S 19/08 | 701/13 |
| 2004/0192197 A1* | 9/2004 | Capots | H04B 7/195 | 455/445 |
| 2004/0192201 A1* | 9/2004 | Febvre | H04B 7/2643 | 455/13.2 |
| 2005/0207375 A1* | 9/2005 | Schiff | H04B 7/18534 | 455/436 |
| 2005/0288011 A1* | 12/2005 | Dutta | H04B 7/18539 | 455/12.1 |
| 2006/0023717 A1* | 2/2006 | Trachtman | H04L 1/0083 | 370/392 |
| 2006/0246913 A1* | 11/2006 | Merboth | H04B 7/1855 | 455/445 |
| 2006/0285481 A1* | 12/2006 | Lane | H04L 5/023 | 370/208 |
| 2007/0070939 A1* | 3/2007 | Hottinen | H04B 7/0647 | 370/328 |
| 2007/0075896 A1* | 4/2007 | Whitehead | G01S 19/53 | 342/357.36 |
| 2007/0078541 A1* | 4/2007 | Rogers | G10L 19/025 | 704/E19.012 |
| 2007/0155316 A1* | 7/2007 | Monte | H04B 7/195 | 455/12.1 |
| 2007/0184778 A1* | 8/2007 | Mechaley, Jr. | H04B 7/2125 | 455/12.1 |
| 2007/0192805 A1* | 8/2007 | Dutta | H04H 20/74 | 725/144 |
| 2007/0216574 A1* | 9/2007 | Huang | G01S 19/41 | 342/357.24 |
| 2007/0218931 A1* | 9/2007 | Beadle | H04W 56/0075 | 455/502 |
| 2008/0056189 A1* | 3/2008 | Hudson | H04B 7/18515 | 370/330 |
| 2008/0099625 A1* | 5/2008 | Yocom | B64G 1/1085 | 244/158.4 |
| 2008/0143589 A1* | 6/2008 | Dankberg | H04L 5/0016 | 342/352 |
| 2008/0170536 A1* | 7/2008 | Marshack | H04B 7/1858 | 370/316 |
| 2008/0219266 A1* | 9/2008 | Agarwal | H04B 7/18528 | 370/392 |

(56) References Cited

U.S. PATENT DOCUMENTS

| | | | |
|---|---|---|---|
| 2008/0278397 A1* | 11/2008 | Rao | H01Q 25/007 343/779 |
| 2008/0279128 A1* | 11/2008 | Hassan | H04W 8/22 370/310 |
| 2008/0311844 A1* | 12/2008 | Eidenschink | H04B 7/2125 455/3.02 |
| 2010/0062706 A1* | 3/2010 | Mills | H04H 20/12 455/13.2 |
| 2010/0128678 A1* | 5/2010 | Thesling | H04L 1/0009 370/328 |
| 2010/0217879 A1* | 8/2010 | Weiner | H04L 41/12 709/227 |
| 2010/0220780 A1* | 9/2010 | Peng | H04L 25/03273 375/345 |
| 2010/0220782 A1* | 9/2010 | Arakawa | H04N 19/152 375/E7.026 |
| 2010/0322337 A1* | 12/2010 | Ylitalo | H04B 7/0634 375/267 |
| 2011/0013678 A1* | 1/2011 | Smith | H04L 5/023 375/267 |
| 2011/0135043 A1* | 6/2011 | Downey | H04L 25/03057 375/346 |
| 2011/0287791 A1* | 11/2011 | Fujishima | H04B 7/024 455/500 |
| 2011/0312320 A1* | 12/2011 | Moeglein | G01S 19/252 455/427 |
| 2012/0018585 A1* | 1/2012 | Liu | B64G 1/242 701/13 |
| 2012/0302160 A1* | 11/2012 | Silny | H04B 7/18508 455/12.1 |
| 2013/0138792 A1* | 5/2013 | Preden | H04W 56/001 709/223 |
| 2013/0148250 A1* | 6/2013 | Day | H01F 13/006 361/149 |
| 2013/0214968 A1* | 8/2013 | Parr | G01S 5/12 342/357.23 |
| 2013/0293415 A1* | 11/2013 | Gutt | G01S 19/40 342/357.25 |
| 2014/0017992 A1* | 1/2014 | Bigras | H04B 7/18519 455/12.1 |
| 2014/0027576 A1* | 1/2014 | Boshuizen | B64G 1/1085 244/158.6 |
| 2014/0105054 A1* | 4/2014 | Sægrov | H04W 64/00 370/252 |
| 2014/0177522 A1* | 6/2014 | Marshack | H04W 40/20 370/316 |
| 2014/0240449 A1* | 8/2014 | Hinohara | H04L 65/765 348/14.09 |
| 2014/0240497 A1* | 8/2014 | Shefer | B64G 1/2423 244/158.4 |
| 2014/0266867 A1* | 9/2014 | Liu | H04L 1/0015 342/200 |
| 2014/0341586 A1* | 11/2014 | Wyler | H04B 7/18521 398/115 |
| 2015/0103723 A1* | 4/2015 | Kim | H04L 5/0051 370/312 |
| 2015/0131512 A1* | 5/2015 | Lauer | H04L 27/0008 370/312 |
| 2015/0197350 A1* | 7/2015 | Ho | B64G 1/242 244/158.4 |
| 2015/0346336 A1* | 12/2015 | Di Giorgio | B64G 1/405 342/25 C |
| 2016/0037434 A1* | 2/2016 | Gopal | H04B 7/1851 370/316 |
| 2016/0080072 A1* | 3/2016 | Baudoin | H04W 40/14 370/219 |
| 2016/0112117 A1* | 4/2016 | Platzer | H04W 24/02 370/316 |
| 2016/0205560 A1* | 7/2016 | Hyslop | H04B 7/18506 455/454 |
| 2016/0269116 A1* | 9/2016 | Welle | H04B 10/29 |
| 2016/0311557 A1* | 10/2016 | Fuller | B64G 1/005 |
| 2016/0365629 A1* | 12/2016 | Yao | H01Q 1/1257 |
| 2017/0026109 A1* | 1/2017 | Wyler | H04B 7/18523 |
| 2017/0067996 A1* | 3/2017 | Coyle | G01S 17/87 |
| 2017/0070939 A1* | 3/2017 | Chong | H04W 36/36 |
| 2017/0124758 A1* | 5/2017 | Jia | G06F 30/20 |
| 2017/0155443 A1* | 6/2017 | Haziza | G01S 5/0263 |
| 2017/0212247 A1* | 7/2017 | Chen | G01S 19/41 |
| 2017/0247123 A1* | 8/2017 | Turner | B64G 1/007 |
| 2017/0324465 A1* | 11/2017 | Sotom | H04B 10/40 |
| 2018/0022474 A1* | 1/2018 | Meek | H04B 7/195 244/158.4 |
| 2018/0069651 A1* | 3/2018 | Davydov | H04W 72/30 |
| 2018/0138968 A1* | 5/2018 | Auer | H04B 7/18515 |
| 2018/0155067 A1* | 6/2018 | Reedy | B64G 1/405 |
| 2018/0156924 A1* | 6/2018 | Reedy | B64G 1/425 |
| 2018/0227272 A1* | 8/2018 | Zaruba | H04L 63/061 |
| 2018/0254824 A1* | 9/2018 | Speidel | H04B 7/18532 |
| 2018/0254825 A1* | 9/2018 | Speidel | H04B 7/2125 |
| 2018/0268605 A1* | 9/2018 | Jia | G06T 1/20 |
| 2018/0275683 A1* | 9/2018 | Lui | B64G 1/405 |
| 2018/0370658 A1* | 12/2018 | Amimoto | B64G 1/2427 |
| 2019/0079196 A1* | 3/2019 | Han | G01S 19/11 |
| 2019/0181946 A1* | 6/2019 | Wendling | H04H 20/74 |
| 2019/0313271 A1* | 10/2019 | Yiu | H04W 72/04 |
| 2019/0353799 A1* | 11/2019 | Grant | H04B 7/1851 |
| 2019/0378356 A1* | 12/2019 | Fang | G07C 5/008 |
| 2020/0006761 A1* | 1/2020 | Fujino | H01M 4/485 |
| 2020/0024012 A1* | 1/2020 | Fortezza | G01S 19/28 |
| 2021/0036772 A1* | 2/2021 | Miranda | H04B 7/18513 |
| 2024/0114423 A1* | 4/2024 | Mukae | H04B 7/18513 |
| 2024/0217676 A1* | 7/2024 | Mukae | H04B 7/1851 |
| 2024/0267115 A1* | 8/2024 | Inai | H04B 7/18504 |
| 2024/0275473 A1* | 8/2024 | Wang | H04B 7/18519 |
| 2024/0308696 A1* | 9/2024 | Mukae | B64G 1/1021 |
| 2024/0333379 A1* | 10/2024 | Mukae | H04B 7/19 |
| 2024/0359829 A1* | 10/2024 | Mukae | B64G 1/1007 |
| 2024/0380487 A1* | 11/2024 | Wang | H04B 7/18513 |
| 2024/0383623 A1* | 11/2024 | Mukae | B64G 1/1007 |

\* cited by examiner

Fig. 16

| SATELLITE ID | ID-1 | ID-2 | ID-3 | ... |
|---|---|---|---|---|
| FORECAST TIME | 12:05 | 12:10 | 12:15 | ... |

LIST

- POSITION COORDINATES AT LAUNCHING DETECTION OF SURVEILLANCE SATELLITE
- POSITION COORDINATES AT WHICH FLYING OBJECT LAUNCHING IS DETECTED
- VISUAL FIELD CHANGE RANGE OF SURVEILLANCE SATELLITE

470 COMMUNICATION ROUTE SEARCH DEVICE

SEARCH FOR ID OF SURVEILLANCE SATELLITE PASSING CLOSE WHICH IS CAPABLE OF PERFORMING SURVEILLANCE CLOSE TO FLYING OBJECT LAUNCHING POINT BY INCLUDING VISUAL FIELD CHANGE

| SATELLITE ID | ID-1 | ID-2 | ID-3 | ... |
|---|---|---|---|---|
| COMMAND | CMD-1 | CMD-2 | CMD-3 | ... |

COMMAND

Fig. 17

| SATELLITE ID | ID-1 | ID-2 | ID-3 | ... |
|---|---|---|---|---|
| FORECAST TIME | 12:05 | 12:10 | 12:15 | ... |

LIST

- POSITION COORDINATES AT LAUNCHING DETECTION OF SURVEILLANCE SATELLITE
- POSITION COORDINATES AT WHICH FLYING OBJECT LAUNCHING IS DETECTED
- VISUAL FIELD CHANGE RANGE OF SURVEILLANCE SATELLITE
- POSITION COORDINATES OF SURVEILLANCE SATELLITE WHICH IS EMITTER OF HIGH-TEMPERATURE SENSING SIGNAL AND POSITION COORDINATES AT WHICH HIGH-TEMPERATURE BODY IS SENSED

SEARCH FOR ID OF SURVEILLANCE SATELLITE PASSING CLOSE WHICH IS CAPABLE OF PERFORMING SURVEILLANCE CLOSE TO HIGH-TEMPERATURE BODY SENSING POSITION BY INCLUDING VISUAL FIELD CHANGE

470 COMMUNICATION ROUTE SEARCH DEVICE

| SATELLITE ID | ID-1 | ID-2 | ID-3 | ... |
|---|---|---|---|---|
| COMMAND | CMD-1 | CMD-2 | CMD-3 | ... |

COMMAND

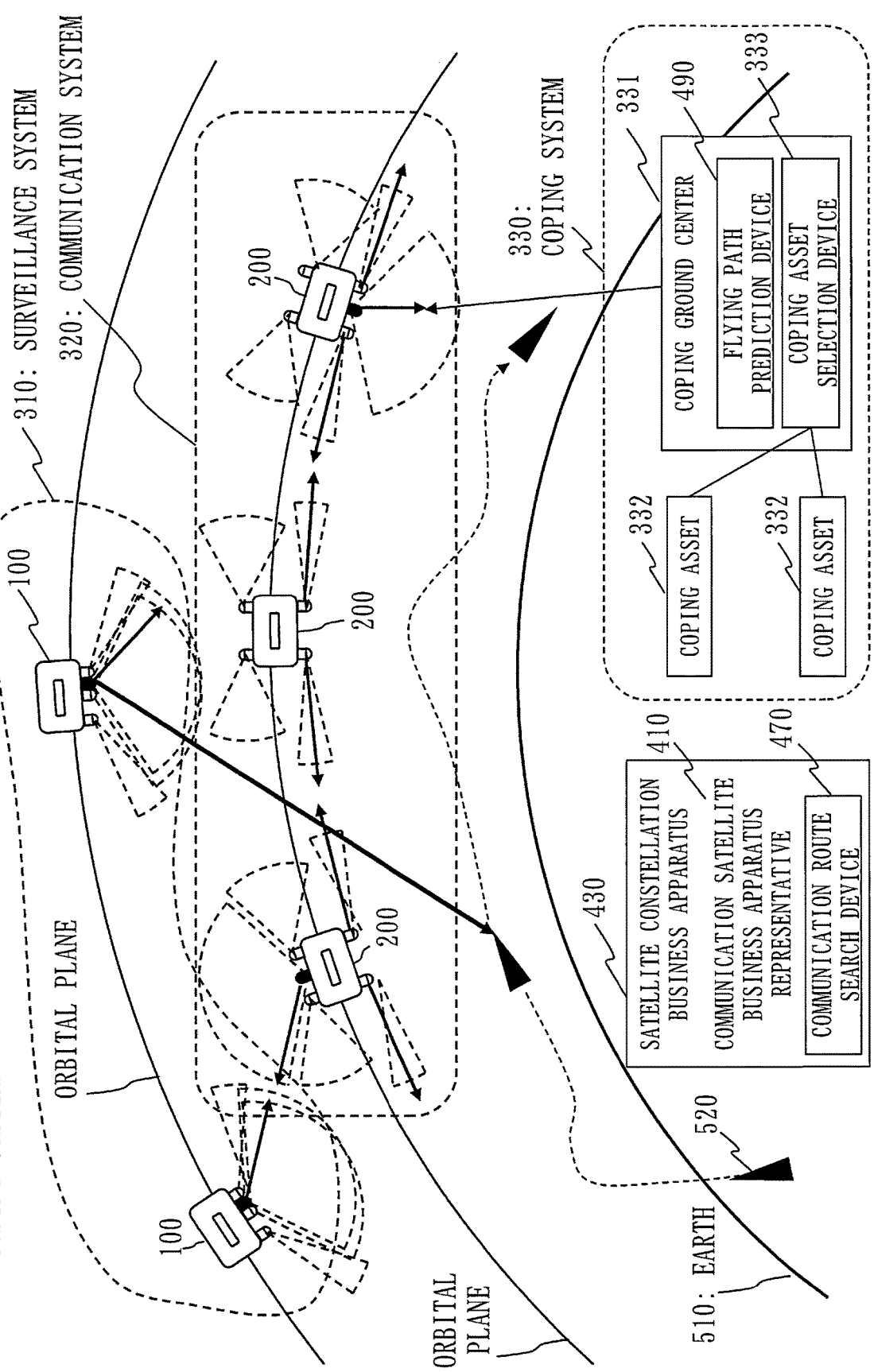

METHOD FOR FORMING UNIFIED SATELLITE CONSTELLATION, UNIFIED DATA LIBRARY, AND UNIFIED SATELLITE CONSTELLATION

CROSS-REFERENCE TO RELATED APPLICATIONS

The present application is based on PCT filing PCT/JP2022/006105, filed Feb. 16, 2022, which claims priority from Japanese Patent Application No. 2021-024772, filed Feb. 19, 2021, the entire contents of each are incorporated herein by reference.

TECHNICAL FIELD

The present disclosure relates to a method for forming a unified satellite constellation, a unified data library, and a unified satellite constellation.

BACKGROUND ART

With the recent advent of flying objects gliding at hypersonic velocities, satellite-based surveillance, such as sensing of flying object firing, tracking of a flight path, or prediction of a landing position, is expected.

As means for sensing and tracking a flying object in the gliding stage, sensing, via infrared, a rise in temperature due to atmospheric friction when a flying object enters into the atmosphere is viewed as promising. As means for sensing a flying object in the gliding stage via infrared, performing surveillance from a group of low earth orbit satellites is considered as promising.

Patent Literature 1 discloses a surveillance satellite for exhaustively performing surveillance over a region at a particular latitude in an entire global surface with a small number of satellites traveling in low orbits.

CITATION LIST

Patent Literature

Patent Literature 1: JP 2008-137439

SUMMARY OF INVENTION

Technical Problem

A distance from an artificial satellite to a flying object is shorter in surveillance from a low orbit than in surveillance from a geostationary orbit. This allows enhancement of infrared-based sensing performance. An enormous number of satellites are needed for constant surveillance by LEO satellites and maintenance of communication circuits. Additionally, an LEO satellite changes in flying position hour by hour, unlike a geostationary satellite which appears to be nearly fixed with respect to an earth fixed coordinate system. For this reason, a surveillance apparatus including an infrared surveillance device, a configuration of a group of communication satellites, and a data transmission method are problems.

The present disclosure has as its object to detect flying object launching using a surveillance system having a group of surveillance satellites including surveillance devices and a satellite information transmission system which forms a communication network from a group of communication satellites and transmit flying object information to a coping system in quasi-real time.

Solution to Problem

A method for forming a unified satellite constellation serving as a one-piece communication medium, in which
a plurality of satellite constellation business apparatuses which manage individual satellite constellations, each having eight or more communication satellites on one orbital plane, are present,
all of the plurality of individual satellite constellations form the unified satellite constellation with eight or more orbital planes,
satellites on a same orbital plane each form inter-satellite cross-links with ones ahead and behind of the satellites,
satellites on adjacent orbital planes each form inter-satellite cross-links with ones in left and right adjacent orbits of the satellites,
the plurality of satellite constellation business apparatuses construct a total of N orbital planes and form a mesh communication network in collaboration, and
a communication satellite business apparatus which provides a communication service using the communication network as a communication medium performs unified control over the plurality of satellite constellation business apparatuses, the method includes:
determining an orbital plane A serving as a representative among orbital planes with a largest number of communication satellites constituting each of the orbital planes;
determining a satellite constellation business apparatus A including the orbital plane A as a satellite constellation business apparatus serving as a representative;
determining a communication satellite A serving as a representative among communication satellites constituting the orbital plane A;
performing control such that an average orbital altitude and an average orbital inclination of all communication satellites constituting the communication satellite business apparatus are equal to an average altitude and an average orbital inclination of the communication satellite A;
performing control such that angular distances between normal vectors of all orbital planes constituting the communication satellite business apparatus are equally spaced in a longitudinal direction with reference to a normal vector of the orbital plane A;
performing control such that in-orbital-plane phases of all the communication satellites constituting the orbital plane A are equally spaced with reference to the communication satellite A;
making in-orbital-plane phases of communication satellites for each of an orbital plane B to an orbital plane N other than the orbital plane A equivalent to the in-orbital-plane phases in the orbital plane A and, if the number of satellites on the orbital plane is insufficient, arranging a virtual satellite;
determining a communication satellite B to a communication satellite N serving as respective representatives for the orbital plane B to the orbital plane N other than the representative orbital plane A;
performing, by each of all the satellite constellation business apparatuses, control such that an average orbital altitude and an average orbital inclination of all satellites are equal to the average altitude and the average orbital inclination of the communication satellite A; and performing control such that ascending node passage times at the time of crossing of a sky above the equator from south to north for the communication satellite A to the communication satellite N have same time lags with reference to the communication satellite A.

Advantageous Effects of Invention

The method for forming the unified satellite constellation according to the present disclosure is capable of transmitting flying object information to a coping system in quasi-real time.

BRIEF DESCRIPTION OF DRAWINGS

FIG. 16 is a diagram of Embodiment 1, illustrating a process by the communication route search device 470.

FIG. 17 is a diagram of Embodiment 1, illustrating a process by the communication route search device 470.

FIG. 18 is a diagram of Embodiment 1, illustrating a process by a flying path prediction device 490.

DESCRIPTION OF EMBODIMENTS

Figure 1:
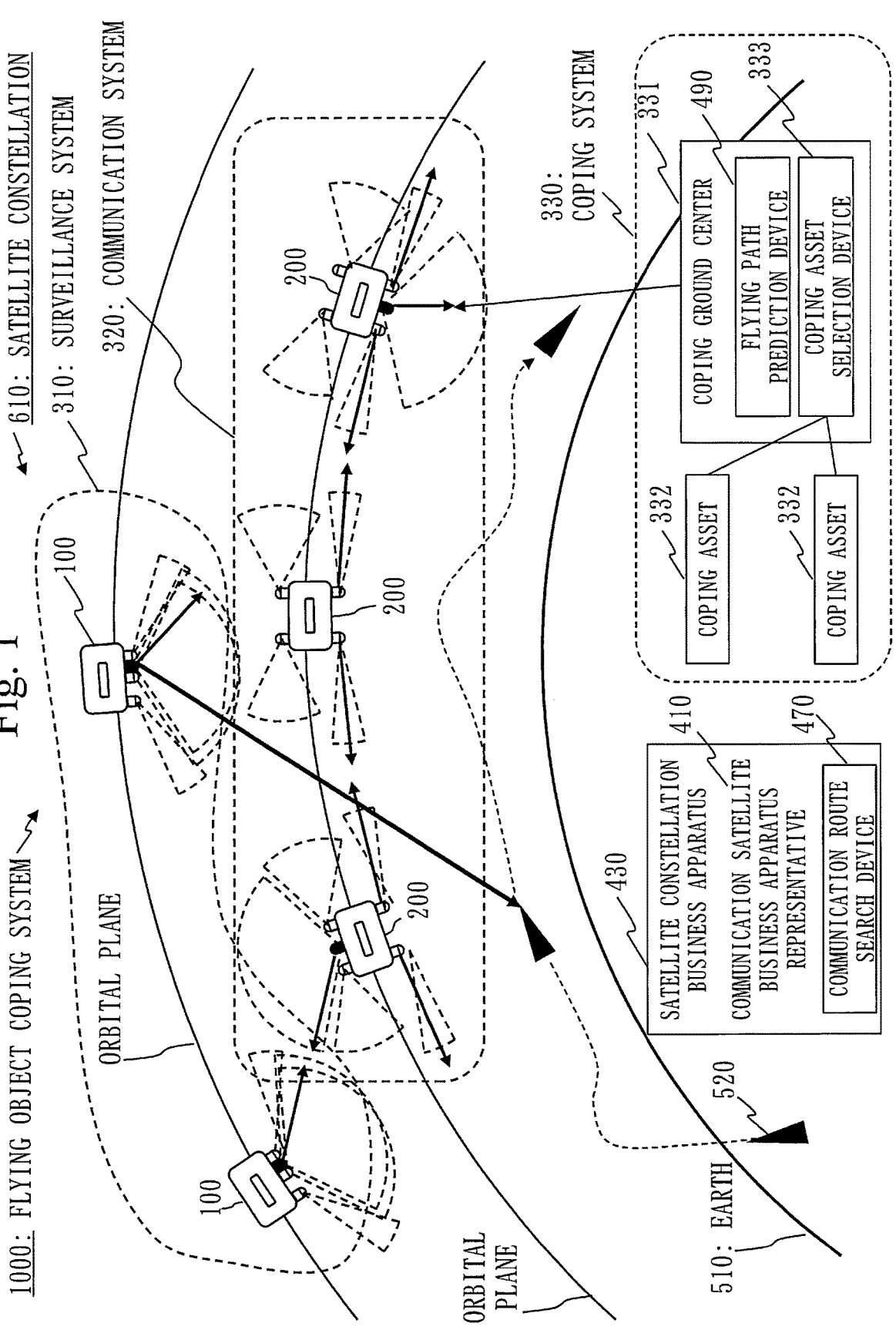
FIG. 1 is a diagram of Embodiment 1, illustrating a configuration example of a flying object coping system 1000.

In the description of embodiments and the drawings, same elements and corresponding elements are denoted by same reference characters. A description of elements denoted by same reference characters will be appropriately omitted or simplified. In the following embodiments, the term "unit" may be appropriately replaced with the term "circuit", "step", "procedure", "process", or "circuitry".

Embodiment 1

FIG. 1 illustrates a configuration example of a flying object coping system 1000. The flying object coping system 1000 includes a surveillance system 310, a communication system 320, and a coping system 330. The surveillance system 310 has a plurality of surveillance satellites 100, each including a surveillance device and a communication device. The communication system 320 has a plurality of communication satellites 200, each including a communication device. The coping system 330 includes a land-sea-and-air coping asset 332 which copes with a flying object 520.

The flying object coping system 1000 transmits flying object information generated through surveillance of the flying object 520 by the surveillance system 310 to the coping system 330 via the communication system 320. The flying object coping system 1000 also has a satellite constellation business apparatus 430 including a communication route search device 470 which searches for a satellite information communication route. The satellite constellation business apparatus 430 transmits an instructive command to the group of surveillance satellites of the surveillance system 310 and the group of communication satellites of the communication system 320 on the basis of a communication route obtained through a search by the communication route search device 470.

The surveillance system 310 has the plurality of surveillance satellites 100, each including an infrared surveillance device. The surveillance system 310 detects, as high-temperature objects, a plume at launching of the flying object 520 and the flying object 520 that rises in temperature and flies. The surveillance system 310 sends time information and position information related to the flying object 520 as flying object information. Specifically, the surveillance satellite 100 detects, with the infrared surveillance device, a plume at launching of the flying object 520 and the flying object 520 that rises in temperature and flies as high-temperature objects. The surveillance system 310 transmits flying object information including time information and position information related to the flying object 520 to the coping system 330 via the communication system 320.

Examples of a satellite 620 and a ground facility 700 in a satellite constellation formation system 600 which forms a satellite constellation 610 will be described using FIGS. 2 to 4. The satellite constellation 610 is a unified satellite constellation. The satellite constellation formation system 600 may be simply called a satellite constellation.

Figure 2:
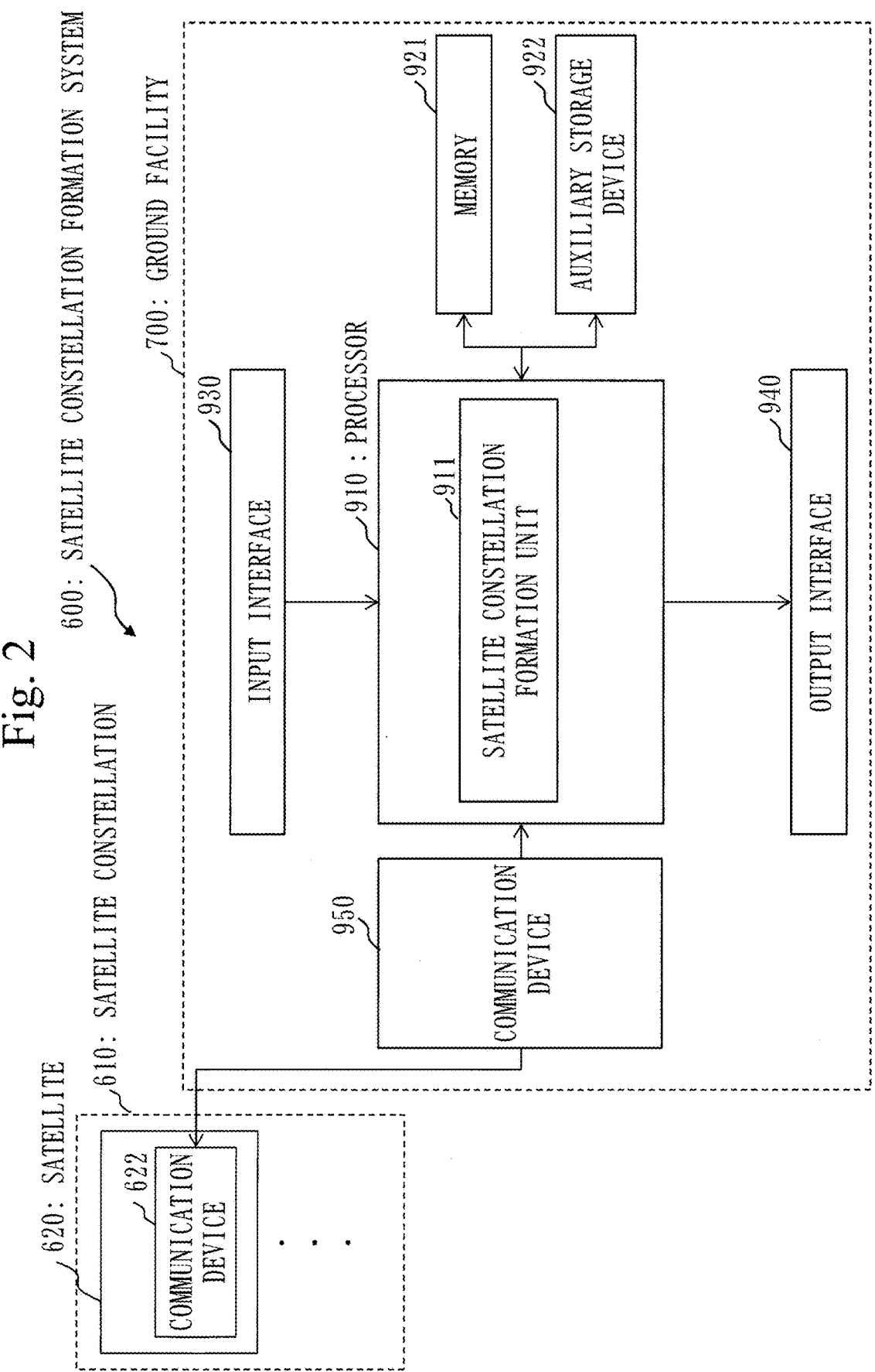
FIG. 2 is a diagram of Embodiment 1, illustrating a configuration example of a satellite constellation formation system 600.

FIG. 2 is a configuration example of the satellite constellation formation system 600. The satellite constellation formation system 600 includes computers. Although a configuration of one computer is illustrated in FIG. 2, each satellite 620 of a plurality of satellites constituting the satellite constellation 610 and the ground facility 700 which communicates with the satellites 620 are each actually provided with a computer. The computer provided in each of each satellite 620 of the plurality of satellites and the ground facility 700 that is to communicate with the satellites 620 collaborates to implement functions of the satellite constellation formation system 600. One example of a configuration of computers which implement the functions of the satellite constellation formation system 600 will be described below.

The satellite constellation formation system 600 includes the satellites 620 and the ground facility 700. Each satellite 620 includes a communication device 622 which communicates with a communication device 950 of the ground facility 700. Of components of the satellite 620, the communication device 622 is illustrated in FIG. 2.

The satellite constellation formation system 600 includes a processor 910 and includes other pieces of hardware, such as a memory 921, an auxiliary storage device 922, an input interface 930, an output interface 940, and the communication device 950. The processor 910 is connected to the other pieces of hardware via signal lines and controls the other pieces of hardware.

The satellite constellation formation system 600 includes a satellite constellation formation unit 911 as a functional element. A function of the satellite constellation formation unit 911 is implemented by hardware or software. The satellite constellation formation unit 911 controls formation of the satellite constellation 610 while communicating with the satellites 620.

Figure 3:
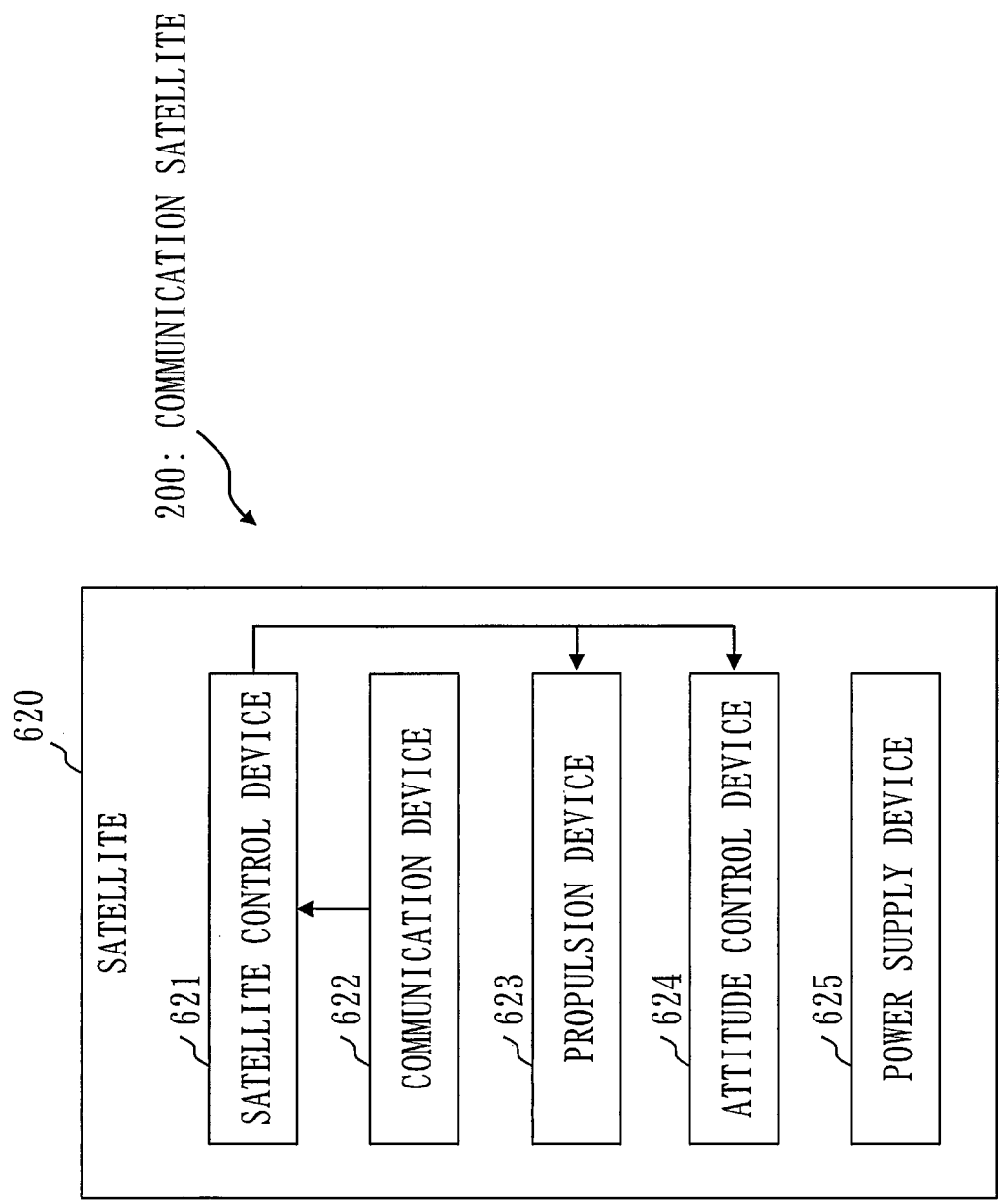
FIG. 3 is a diagram of Embodiment 1, illustrating one example of a configuration of a satellite 620 of the satellite constellation formation system 600.

FIG. 3 is one example of a configuration of the satellite 620 of the satellite constellation formation system 600. The satellite 620 includes a satellite control device 621, the communication device 622, a propulsion device 623, an attitude control device 624, and a power supply device 625. Although the satellite 620 may include other constituent elements which implement various types of functions, the satellite control device 621, the communication device 622, the propulsion device 623, the attitude control device 624, and the power supply device 625 will be illustrated in FIG. 3. The satellite 620 in FIG. 3 is an example of the communication satellite 200 that includes the communication device 622.

The satellite control device 621 is a computer which controls the propulsion device 623 and the attitude control device 624 and includes a processing circuit. Specifically, the satellite control device 621 controls the propulsion device 623 and the attitude control device 624 in accordance with various types of commands transmitted from the ground facility 700.

The communication device 622 is a device which communicates with the ground facility 700. Alternatively, the communication device 622 is a device which communicates with the satellite 620 ahead or behind on a same orbital plane or the satellite 620 on an adjacent orbital plane. Specifically, the communication device 622 sends various types of data related to its satellite to the ground facility 700 or the different satellite 620. The communication device 622 also receives various types of commands transmitted from the ground facility 700. The propulsion device 623 is a device which gives propulsive force to the satellite 620 and changes a velocity of the satellite 620. The attitude control device 624 is a device for controlling an attitude of the satellite 620 and attitude elements, such as an angular velocity and a line of sight, of the satellite 620. The attitude control device 624 changes each attitude element in a desired direction. Alternatively, the attitude control device 624 maintains each attitude element in a desired direction. The attitude control device 624 includes an attitude sensor, an actuator, and a controller. The attitude sensor is a device, such as a gyroscope, an earth sensor, a solar sensor, a star tracker, a thruster, and a magnetic sensor. The actuator is a device, such as an attitude control thruster, a momentum wheel, a reaction wheel, and a control moment gyro. The controller controls the actuator in accordance with measurement data from the attitude sensor or various types of commands from the ground facility 700. The power supply device 625 includes instruments, such as a solar cell, a battery, and a power control device, and supplies power to instruments mounted on the satellite 620.

The processing circuit provided in the satellite control device 621 will be described. The processing circuit may be dedicated hardware or a processor which executes a program stored in a memory. In the processing circuit, some functions may be implemented by dedicated hardware, and the other functions may be implemented by software or firmware. That is, the processing circuit can be implemented by hardware, software, firmware, or a combination thereof. Specifically, dedicated hardware is a single circuit, a composite circuit, a programmed processor, a parallel-programmed processor, an ASIC, an FPGA, or a combination thereof. ASIC stands for Application Specific Integrated Circuit. FPGA stands for Field Programmable Gate Array.

Figure 4:
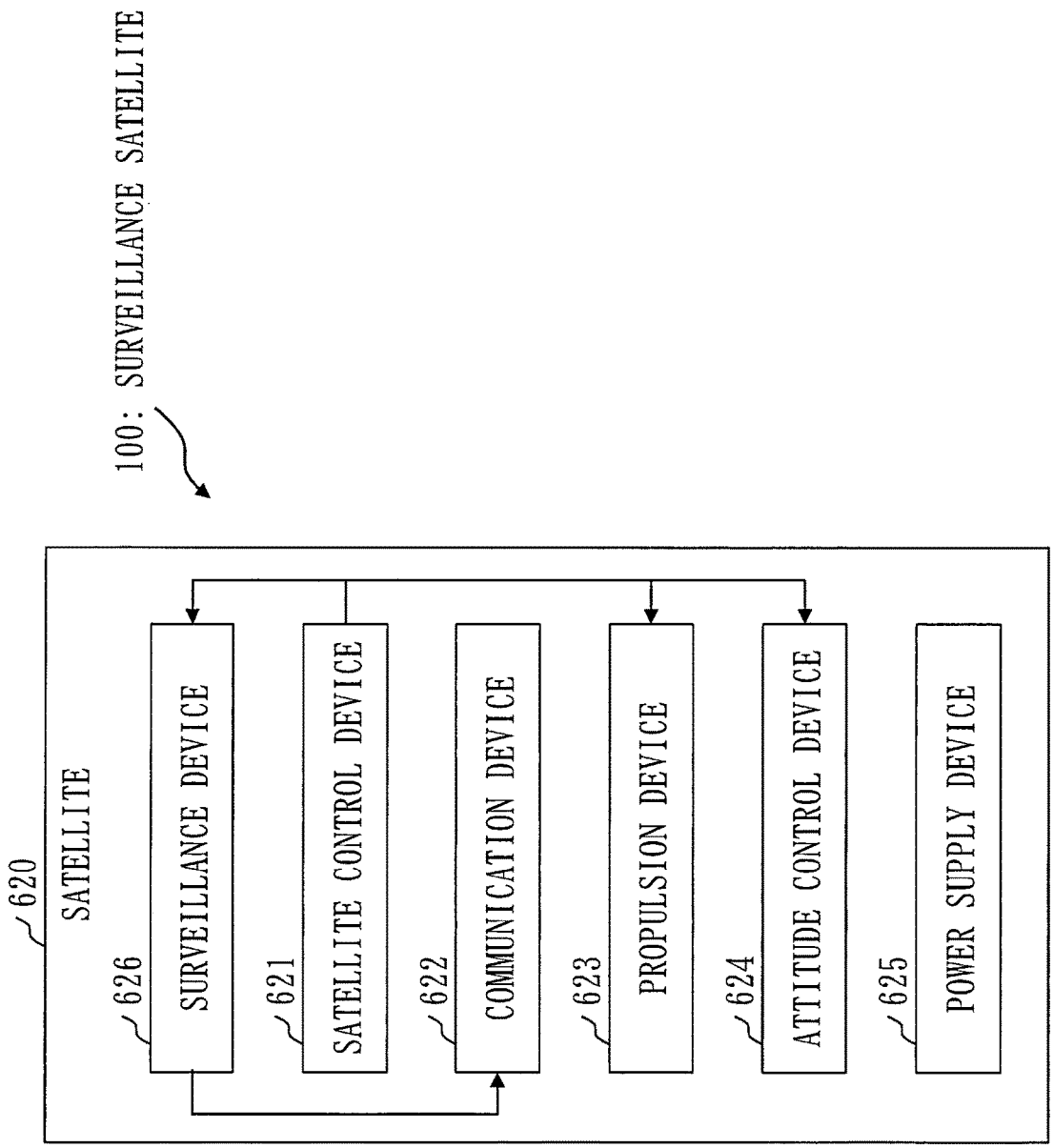
FIG. 4 is a diagram of Embodiment 1 and is another diagram illustrating one example of the configuration of the satellite 620 of the satellite constellation formation system 600.

FIG. 4 is another example of the configuration of the satellite 620 of the satellite constellation formation system 600. The satellite 620 in FIG. 4 includes a surveillance device 626, in addition to the components in FIG. 3. The surveillance device 626 is a device which performs surveillance over a body. Specifically, the surveillance device 626 is a device for performing surveillance over or observing a body, such as a cosmic body, a flying object, or a land-sea-and-air movable body. The surveillance device 626 is also referred to as an observation device. For example, the surveillance device 626 is an infrared surveillance device which senses, via infrared, a rise in temperature due to atmospheric friction when a flying object enters into the atmosphere. The surveillance device 626 senses a plume at launching of a flying object or a temperature of a flying object body. Alternatively, the surveillance device 626 may be a light wave or radio wave information collection device. The surveillance device 626 may be a device which senses a body with an optical system. The surveillance device 626 shoots a body which flies at an altitude different from an orbital altitude of an observation satellite with the optical system. Specifically, the surveillance device 626 may be a visible optical sensor. The satellite 620 in FIG. 4 is an example of the surveillance satellite 100 including the surveillance device 626 and the communication device 622. The surveillance satellite 100 may include a plurality of surveillance devices 626. The surveillance satellite 100 may include a plurality of types of surveillance devices.

<Method for Forming Satellite Constellation>

The satellite constellation 610 to be formed by the satellite constellation formation system 600 will be described. The satellite constellation 610 is formed through control of the satellites 620 by the ground facility 700.

Figure 5:
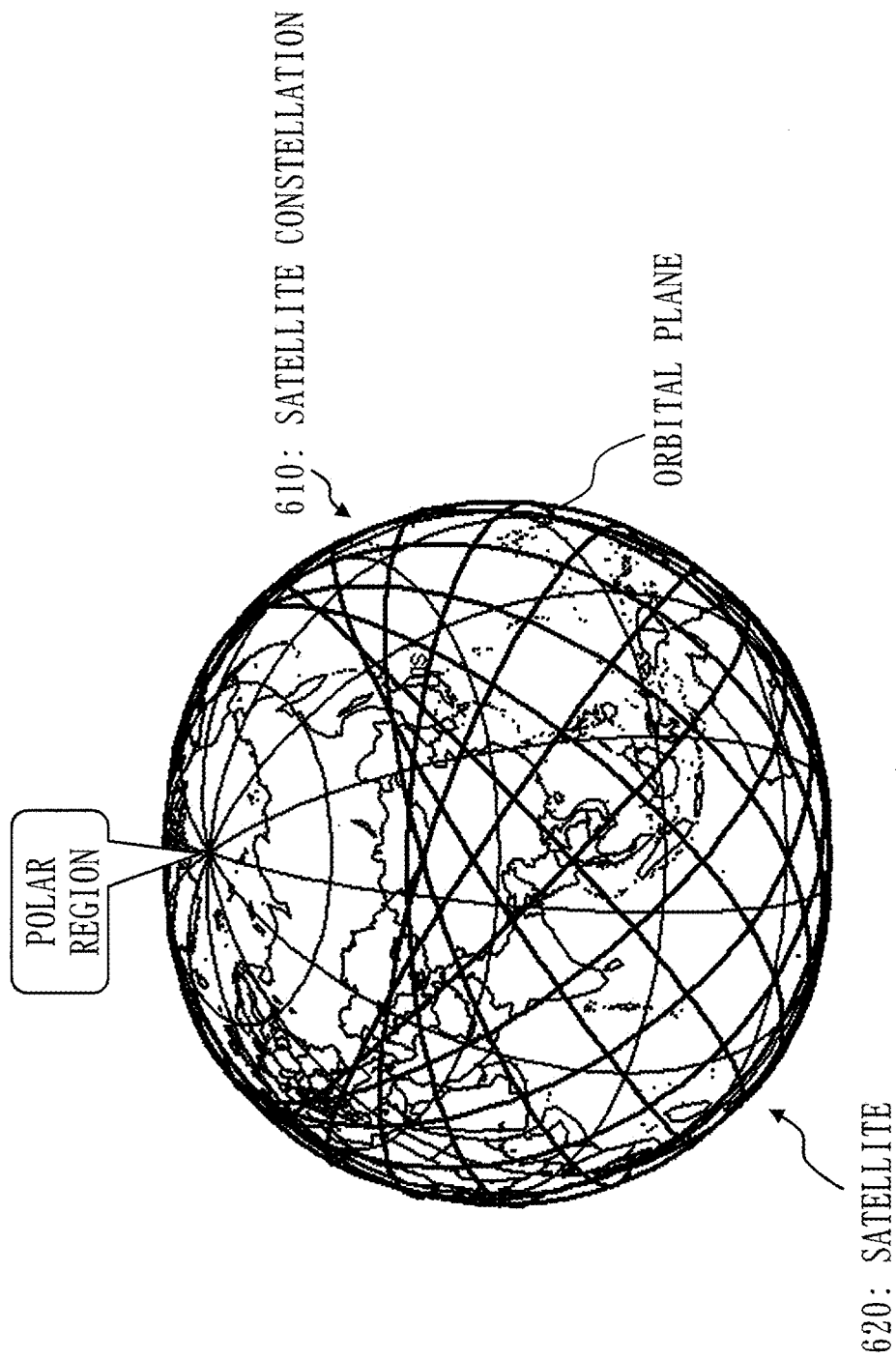
FIG. 5 is a diagram of Embodiment 1, illustrating an example of a satellite constellation 610 having a plurality of orbital planes intersecting outside a polar region.

FIG. 5 is a diagram illustrating an example of the satellite constellation 610 having a plurality of orbital planes intersecting outside a polar region as one example of the satellite constellation 610. The surveillance system 310 and the communication system 320 are formed as the satellite constellation 610. In the satellite constellation 610 in FIG. 5, each orbit is an inclined orbit.

In the satellite constellation 610 according to Embodiment 1 illustrated in FIG. 1, a plurality of satellite constellation business apparatuses 430 which manage individual satellite constellations, each having eight or more communication satellites on one orbital plane, are present. All of the plurality of individual satellite constellations form a unified satellite constellation with eight or more orbital planes. The satellite constellation 610 is a unified satellite constellation. In the satellite constellation 610, satellite constellations with eight or more orbital planes are formed. Artificial satellites (hereinafter referred to as satellites) on a same orbital plane each form inter-satellite cross-links with satellites ahead and behind flying in orbits. Satellites on adjacent orbital planes each form inter-satellite cross-links with satellites in left and right adjacent orbits.

With these cross-links, the plurality of satellite constellation business apparatuses 430 construct a total of N orbital planes and form a mesh communication network in collaboration. A communication satellite business apparatus 410 provides a communication service using the communication network as a communication medium. For this reason, the communication satellite business apparatus 410 performs unified control over the plurality of satellite constellation business apparatuses 430 and forms a unified satellite constellation serving as a one-piece communication medium. A communication satellite business apparatus may be read as a communication service provision system.

A method for forming the satellite constellation 610 will be described below.

As described above, the satellite constellation 610 is formed by the ground facility 700. More specifically, the satellite constellation 610 is formed by the satellite constellation formation unit 911 of the ground facility 700.

Figure 6:
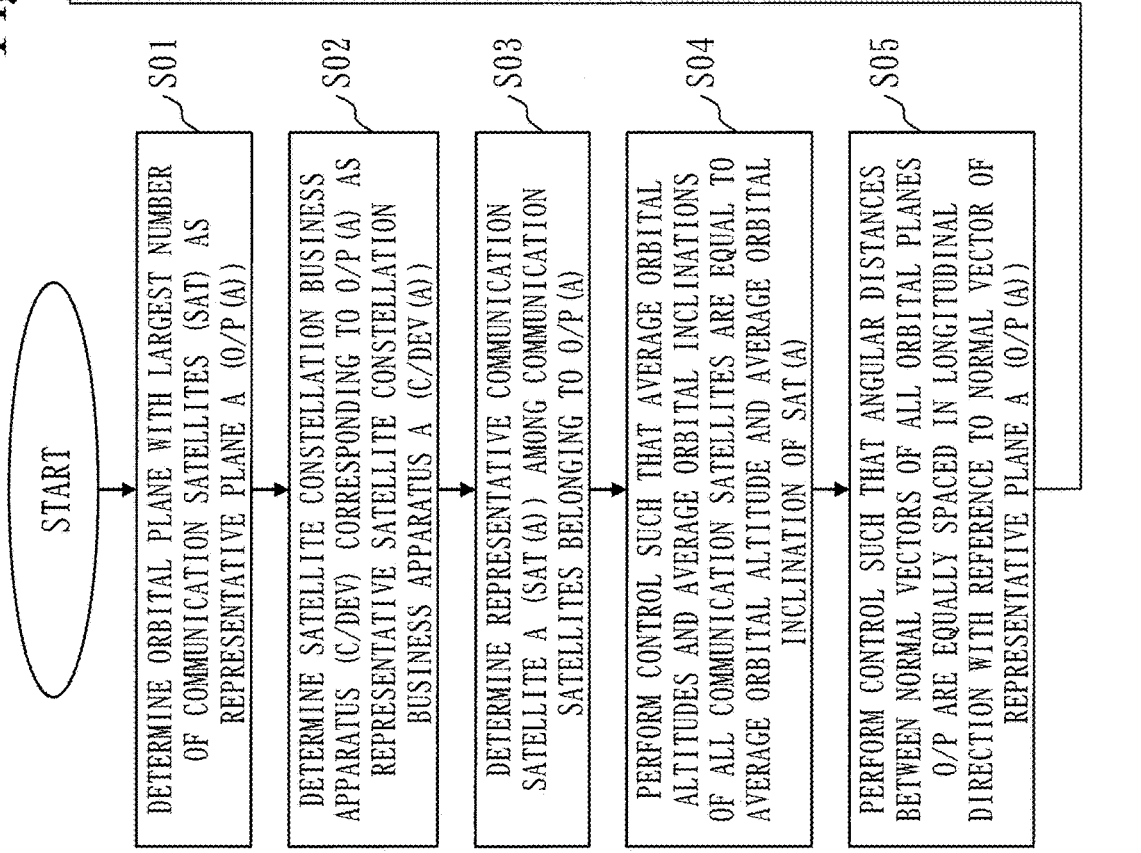
FIG. 6 is a chart of Embodiment 1, illustrating steps in which a satellite constellation formation unit 911 forms the satellite constellation 610.

FIG. 6 illustrates steps in which the satellite constellation formation unit 911 forms the satellite constellation 610.

Figure 7:
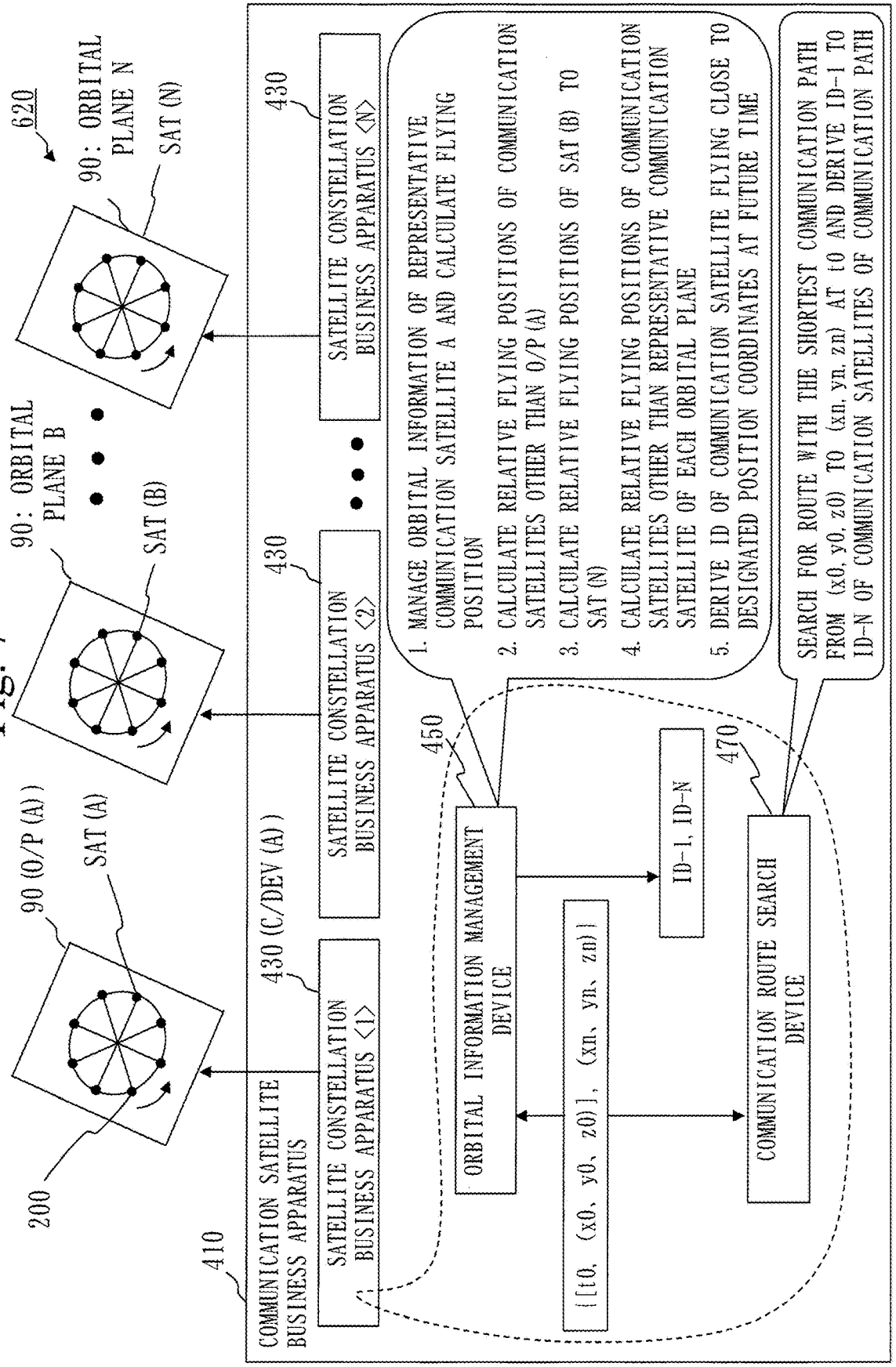
FIG. 7 is a diagram of Embodiment 1, illustrating a state in which satellite constellation business apparatuses 430 manage orbital planes 90.

FIG. 7 illustrates a state in which the satellite constellation business apparatuses 430 manage orbital planes 90. The satellite constellation business apparatuses 430 are ground facilities 700.
<Step S01>

In step S01, the satellite constellation formation unit 911 determines an orbital plane A serving as a representative among orbital planes with a largest number of communication satellites constituting each of the orbital planes. The orbital plane A will be referred to as the representative plane A hereinafter. The representative orbital plane A may be denoted by O/P(A). In FIG. 7, an orbital plane 90 managed by a satellite constellation business apparatus 430<1> is determined as the representative plane A.
<Step S02>

In step S02, the satellite constellation formation unit 911 determines the satellite constellation business apparatus 430<1> including the representative plane A as a satellite constellation business apparatus serving as a representative. In FIG. 7, the satellite constellation business apparatus 430<1> serving as the representative is denoted by C/DEV (A).
<Step S03>

In step S03, the satellite constellation formation unit 911 determines a communication satellite A serving as a representative among the communication satellites 200 constituting the representative plane A. The communication satellite A serving as the representative may be denoted by SAT(A) or may be referred to as the representative communication satellite A.

In step S04, the satellite constellation formation unit 911 performs control such that an average orbital altitude and an average orbital inclination of all the communication satellites 200 constituting the communication satellite business apparatus 410 are equal to an average orbital altitude and an average orbital inclination of the communication satellite A.
<Step S05>

In step S05, the satellite constellation formation unit 911 performs control such that angular distances between normal vectors of all orbital planes constituting the communication satellite business apparatus 410 are equally spaced in a longitudinal direction with reference to a normal vector of the representative plane A.
<Step S06>

In step S06, the satellite constellation formation unit 911 performs control such that in-orbital-plane phases of all the communication satellites 200 constituting the representative plane A (O/P(A)) are equally spaced with reference to the communication satellite A.
<Step S07>

In step S07, the satellite constellation formation unit 911 performs control, for each of an orbital plane B to an orbital plane N other than the representative plane A, such that in-orbital-plane phases of the communication satellites 200 are equivalent to those in the orbital plane A and, if the number of satellites on the orbital plane is insufficient, arranges a virtual satellite.
<Step S08>

In step S08, the satellite constellation formation unit 911 determines a communication satellite B to a communication satellite N serving as respective representatives for the orbital plane B to the orbital plane N other than the representative plane A. The representative satellites may be denoted by SAT(B) to SAT(N).
<Step S09>

In step S09, the satellite constellation formation unit 911 of each of all the satellite constellation business apparatuses 430 performs control such that an average orbital altitude and an average orbital inclination of the communication satellites 200 to be managed are equal to the average orbital altitude and the average orbital inclination of the communication satellite A.
<Step S10>

In step S10, the satellite constellation formation unit 911 performs control such that ascending node passage times at the time of crossing of the sky above the equator from south to north for the communication satellite A to the communication satellite N have same time lags with reference to the communication satellite A. The time lags mean that there are equal time lags between the communication satellite A and the communication satellite B, between the communication satellite B and the communication satellite C, . . . , between a communication satellite N−1 and the communication satellite N with reference to the communication satellite A.
<Mesh Communication Network Formation Method>

Figure 8:
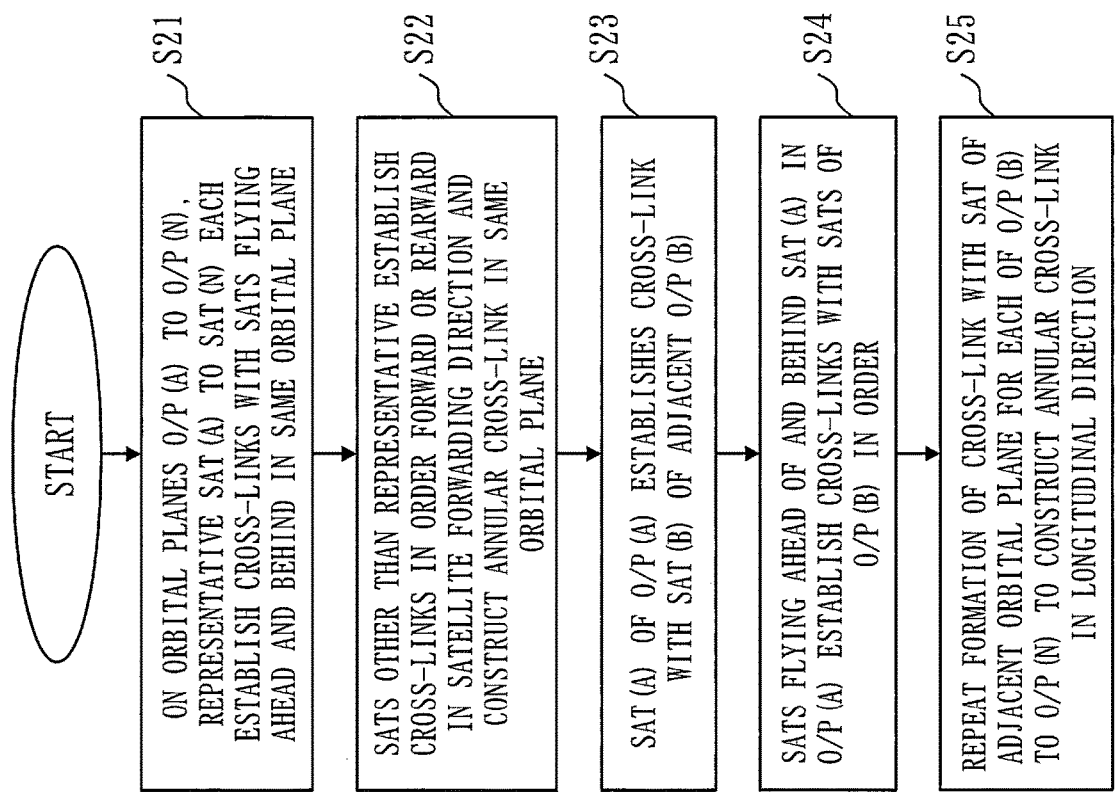
FIG. 8 is a chart of Embodiment 1 and is a flowchart in which the satellite constellation formation unit 911 forms a mesh communication network.

A mesh communication network is formed on the basis of SAT(A), SAT(B), . . . , SAT(N) that are representative satellites determined by the satellite constellation formation units 911. FIG. 8 is a flowchart in which the satellite constellation formation unit 911 forms a mesh communication network.

Figure 9:
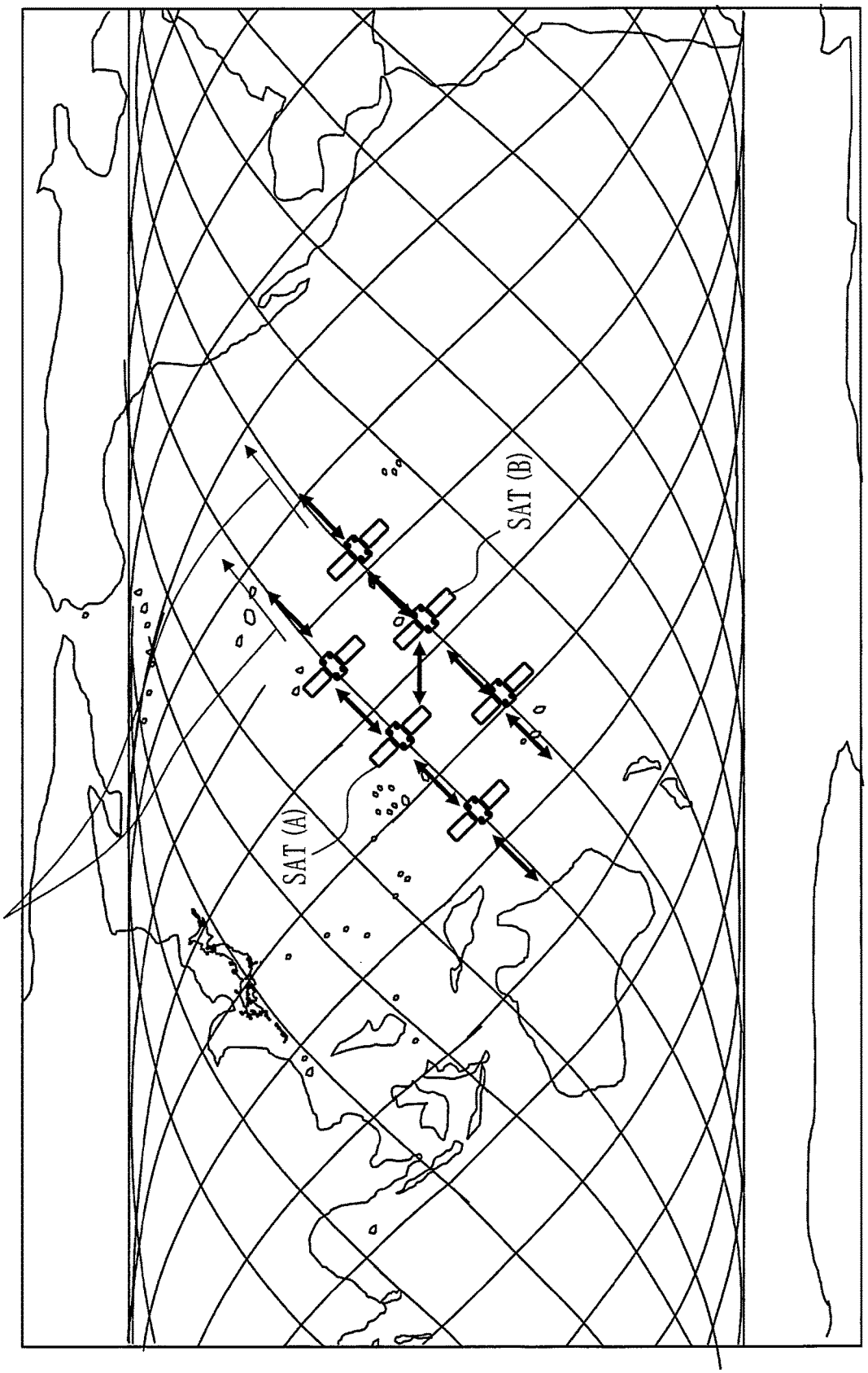
FIG. 9 is a diagram of Embodiment 1, illustrating the formation of the mesh communication network.

FIG. 9 is a diagram illustrating the formation of the mesh communication network. FIG. 9 illustrates orbits of SAT(A) and SAT(B).

In step S21, as illustrated in FIG. 9, on the respective orbital planes, SAT(A), SAT(B), . . . , SAT(N) serving as the representatives each establish cross-links with the communication satellites 200 flying ahead and behind in the corresponding orbital plane.

In step S22, the communication satellites 200 establish cross-links in order forward or rearward in a satellite forwarding direction and construct an annular cross-link in a same orbital plane.

In step S23, between the adjacent orbital planes, SAT(A) of the representative plane A establishes a cross-link with SAT(B) of the adjacent orbital plane B.

In step S23, between the adjacent orbital planes, SAT (A) of the representative plane A establishes a cross-link with SAT (B) of the adjacent orbital plane B.

In step S24, the communication satellites 200 flying ahead of and behind SAT (A) in O/P (A) establish cross-links in order with communication satellites of the adjacent orbit plane B.

An orbital information management device 450 will be described with reference to FIG. 7. The communication satellite business apparatus 410 includes the orbital information management device 450.

(1) The orbital information management device 450 manages orbital information of SAT(A) with high accuracy and high frequency and calculates flying position coordinates of SAT(A) at a particular time in an earth fixed coordinate system.

(2) The orbital information management device 450 calculates flying position coordinates at the particular time of ones other than SAT(A) on the representative plane A with reference to the position coordinates of SAT(A).

(3) The orbital information management device 450 calculates flying position coordinates at the particular time of SAT(B) to SAT(N) of the orbital plane B to the orbital plane N other than the representative plane A with reference to the position coordinates of SAT(A).

(4) The orbital information management device 450 calculates communication satellite IDs and flying position coordinates at the particular time of ones other than the representative communication satellite of each orbital plane with reference to the position coordinates of SAT(A).

(5) The orbital information management device 450 derives an ID of a communication satellite which flies close to designated position coordinates at an arbitrary time in the future.

<I/O IF of Communication Satellite Business Apparatus 410>

A description will be given with reference to FIG. 7. The orbital information management device 450 imposes an I/O requirement for a time to serving as a sending starting point, position coordinates (x0,y0,z0) serving as a sending starting point, and position coordinates (xn,yn,zn) of a receiving asset which are designated by a communication service user.

Input and output in the I/O requirement are both input conditions for the orbital information management device to derive an output. Communication satellites which appear in the process of transmission to the position coordinates of the receiving asset are selected, and ID-1 of a communication satellite which flies close to (x0,y0,z0) at the time t0 and ID-N of a communication satellite which flies close to (xn,yn,zn) after a time lag until reception are outputs to be derived by the orbital information management device.

The orbital information management device 450 derives ID-1 of the communication satellite 200 that flies close to (x0,y0,z0) at the time to and ID-N of the communication satellite 200 that flies close to (xn,yn,zn) after the time lag until reception. As for the term "time lag until reception", in the process of communication from a sending starting point to an ending point for final reception, time lags, such as a command generation time lag, a waiting time before a satellite comes close, and a communication time required for transmission and reception for each intermediary satellite in the process of communication, accumulate. The term "time lag until reception" means a time lag including the time lags.

<Communication Route Search Device 470>

A description will be given with reference to FIG. 7. The communication satellite business apparatus 410 includes the communication route search device 470. The communication route search device 470 sets, as an I/O requirement, the time to and the position coordinates (x0,y0,z0) serving as the sending staring points and the position coordinates (xn,yn, zn) of the receiving asset, which are designated by the communication service user. The communication route search device 470 makes a search for a route with a shortest communication path from (x0,y0,z0) to (xn,yn,zn) at a time t0 and derives ID-1 to ID-N of communication satellites serving as the communication path.

<Mesh Communication

A description will be given with reference to FIG. 7. As illustrated in FIG. 7, a satellite constellation business apparatus A (the satellite constellation business apparatus <1> which manages the representative orbital plane) which is a representative of satellite constellation business apparatuses includes the orbital information management device 450 and the communication route search device 470. The representative satellite constellation business apparatus A gives a communication instruction to communication IDs serving as a communication path for particular communication for the other satellite constellation business apparatuses.

<Mesh Communication>

Figure 10:
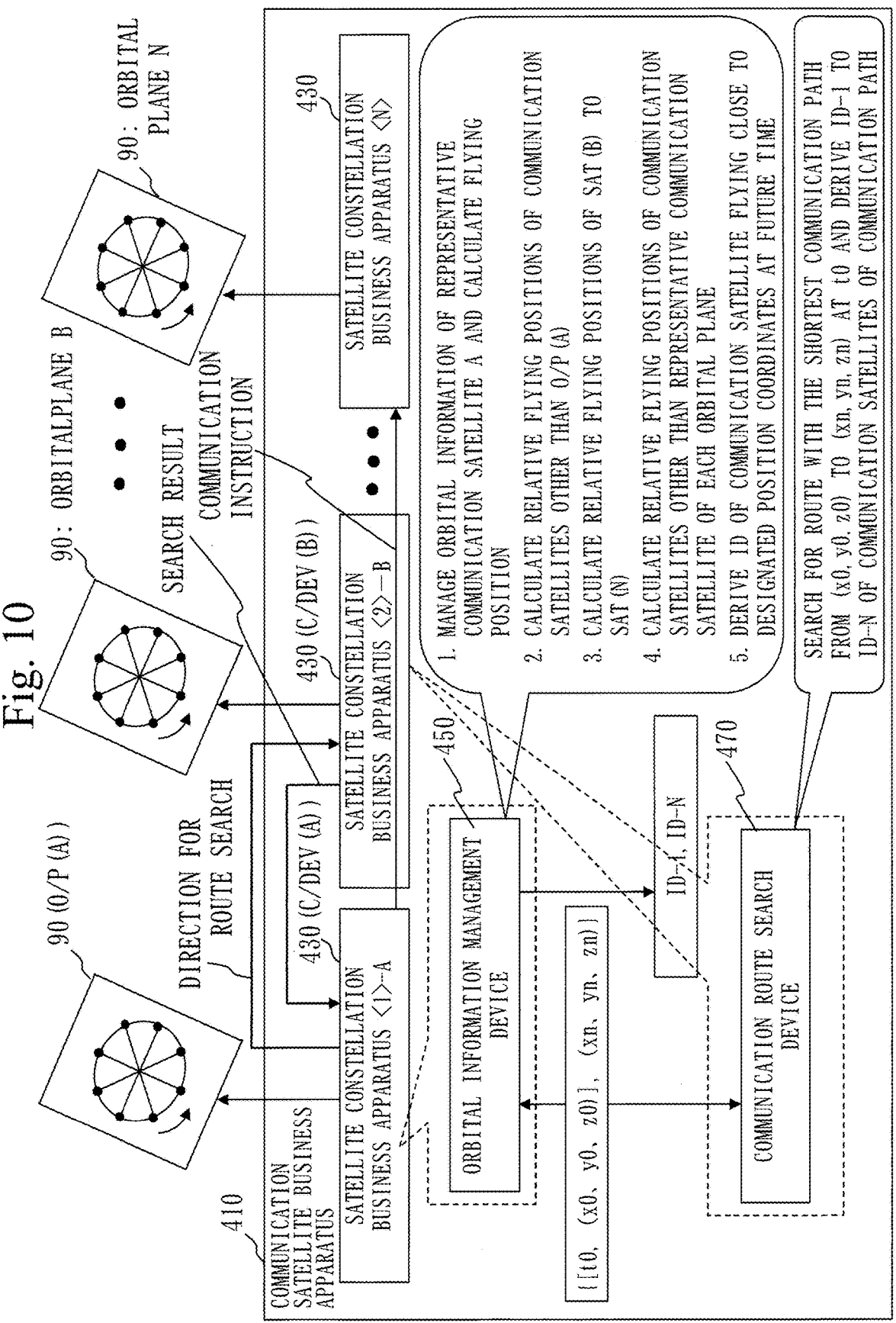
FIG. 10 is a diagram of Embodiment 1, illustrating a state in which the satellite constellation business apparatuses 430 manage the orbital planes 90.

FIG. 10 is a diagram of a state in which the satellite constellation business apparatuses 430 manage the orbital planes 90. A description will be given with reference to FIG. 10. As illustrated in FIG. 10, a satellite constellation business apparatus A (the satellite constellation business apparatus <1>-A which manages the representative orbital plane) which is a representative of the satellite constellation business apparatuses includes the orbital information management device 450. A different satellite constellation business apparatus B (the satellite constellation business apparatus <2>-B) includes the communication route search device 470. As illustrated in FIG. 10, the satellite constellation business apparatus <1>-A directs the satellite constellation business apparatus <2>-B to make a route search. The satellite constellation business apparatus <1>-A gives a communication instruction to communication IDs serving as a communication path for particular communication for other satellite constellation business apparatus <2>, . . . , <N> on the basis of a result of the search.

Among many communication requests, a communication instruction is given to, for example, a communication ID (for which satellites of a plurality of business operators are possible candidates) serving as a communication path for "particular communication" which is a detector of flying object launching.

<User IF in Communication Satellite Business Apparatus>

As illustrated in FIG. 1, the communication satellite 200 includes a communication device which makes inter-satellite communication with the surveillance satellite 100 that is a user satellite which flies in cosmic space. The communication satellite 200 transmits sending information of a user satellite designated by a user to a different user satellite or a ground facility designated by the user.

<Tracking Transmission 1 in Communication Satellite Business Apparatus 410>

Assume that the surveillance satellite 100 is a user satellite in FIG. 1. A given user satellite (A) detects flying object launching, and a time t0 serving as a starting point for sending of acquired information, an ID of the user satellite (A), position coordinates of the user satellite (A), and position coordinates of a ground center as a transmission destination, such as a coping ground center 331, are designated. The communication route search device 470 illustrated in FIG. 7 or FIG. 10 that the communication satellite business apparatus 410 includes derives an optimum communication route and gives a communication instruction to communication satellites serving as a communication path.

As for the "acquired information", if a high-temperature body is detected by an infrared surveillance device, a launching detection time and position coordinates at which flying object launching is detected and, optionally, image information, luminance information, and the like which are acquired are sent. The acquired information here is information including the pieces of information.

<Tracking Transmission 2 in Communication Satellite Business Apparatus 410>

Assume that the surveillance satellite 100 is a user satellite in FIG. 1.

Figure 11:
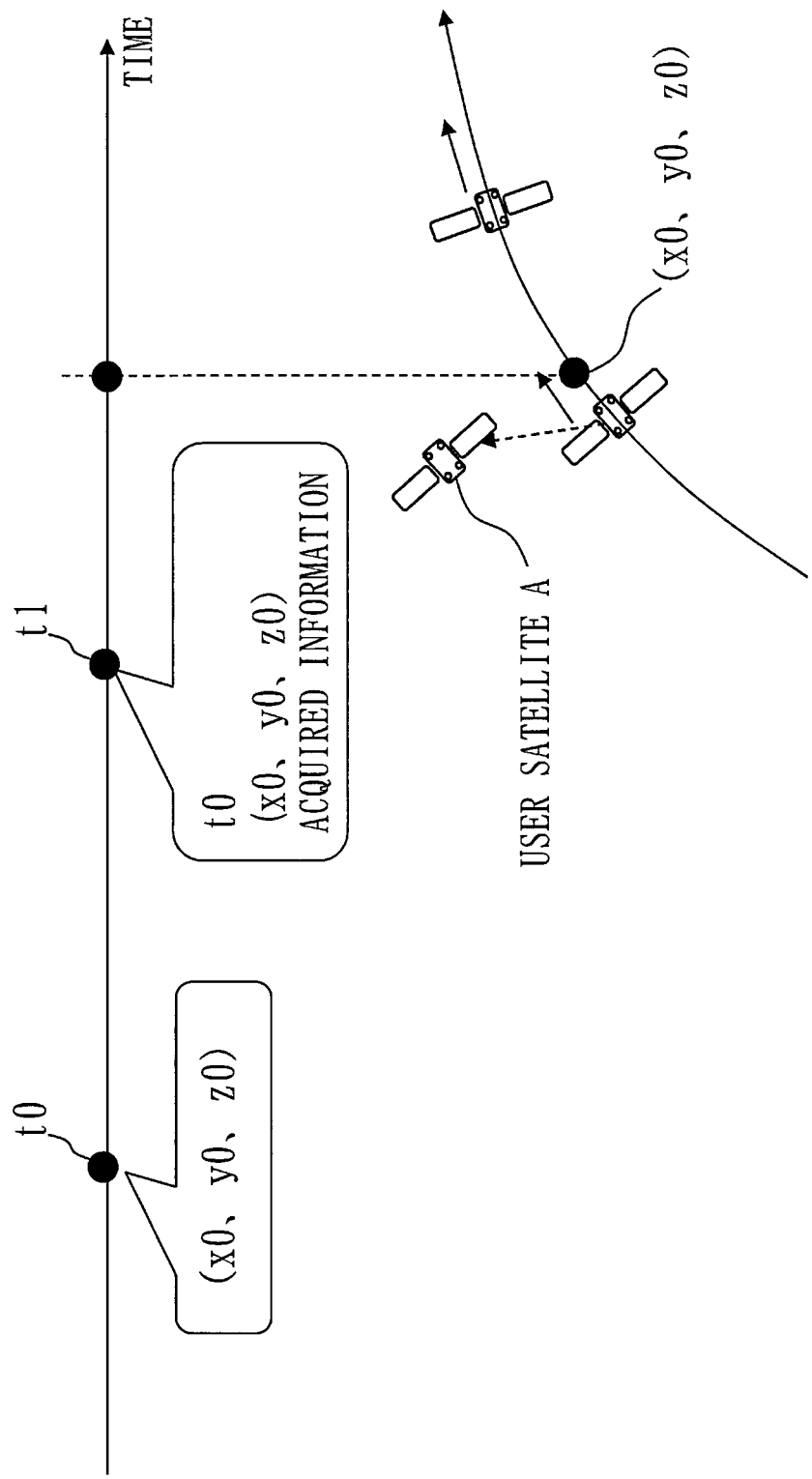
FIG. 11 is a diagram of Embodiment 1, illustrating tracking transmission.

FIG. 11 is a diagram illustrating tracking transmission. Reference is made to FIG. 11. A user satellite (A) detects flying object launching and designates a detection time t0, position coordinates (x0,y0,z0) at which a flying object is detected, a time t1 serving as a starting point for sending of acquired information, and an ID and position coordinates of the user satellite (A). In response to a demand to send flying object information to a plurality of different user satellites which fly close to (x0,y0,z0) after t0, the communication satellite business apparatus 410 gives a communication instruction to a communication satellite which flies close to (x0,y0,z0) after t0 such that the communication satellite transmits flying object information to the user satellites flying close.

Note that a communication route of a carrier is used to transmit flying object information from the surveillance satellite A that is a detector of launching to succeeding surveillance satellites B and C. In this case, a group of surveillance satellites and a group of communication satellites are both flying and change in position hour by hour. For this reason, communication needs to be made with an appropriate time lag including a satellite waiting time, a transmission delay, and the like at a selected timing when a succeeding surveillance satellite and a communication satellite approach each other.

<Tracking Transmission 3 in Communication Satellite Business Apparatus 410>

Figure 12:
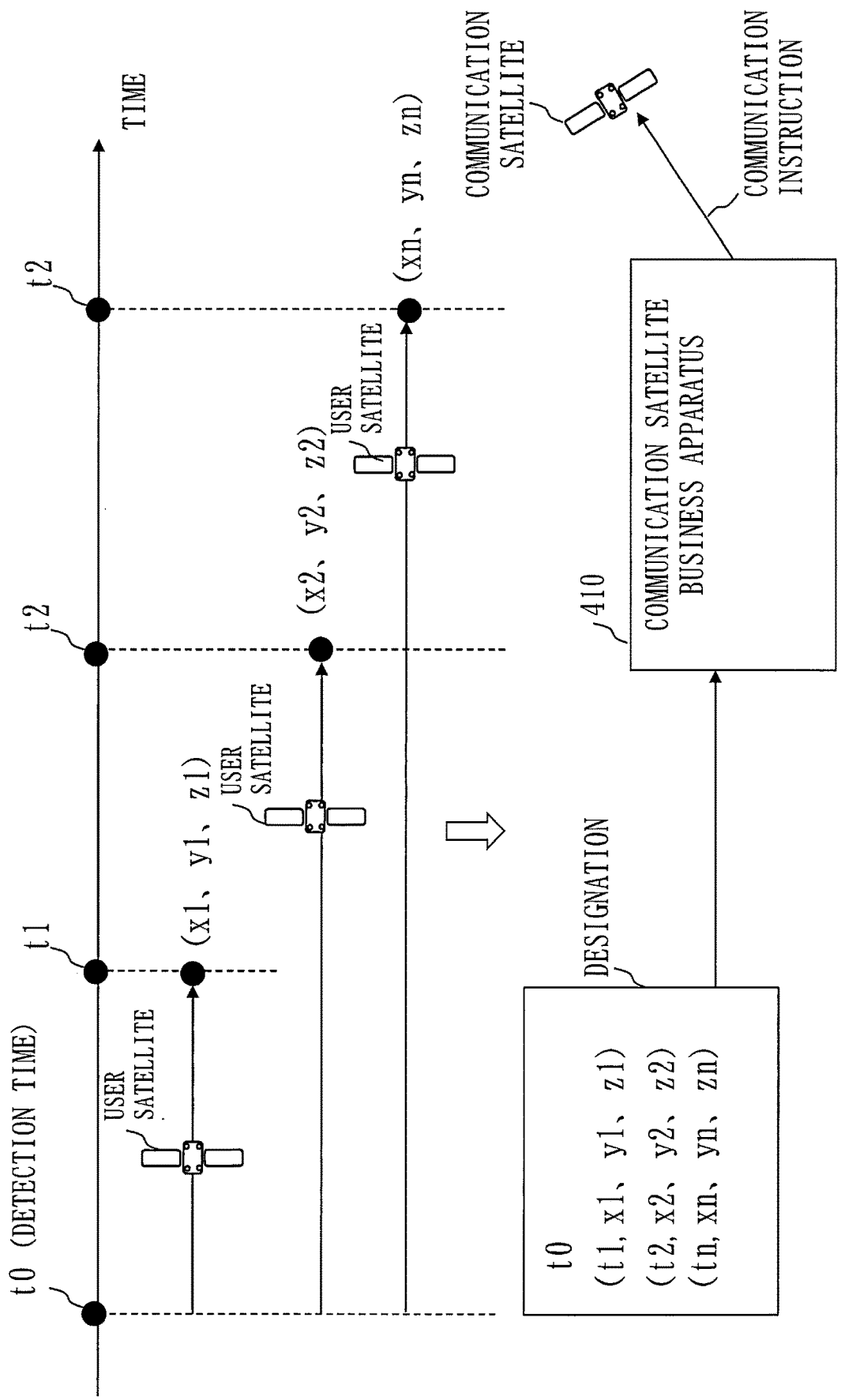
FIG. 12 is a diagram of Embodiment 1, illustrating tracking transmission.

FIG. 12 is a different diagram illustrating tracking transmission. Reference is made to FIG. 12. A user satellite is a flying object surveillance satellite. A user satellite (A) detects flying object launching and designates a detection time t0 and B(t1,x1,y1,z1), C(t2,x2,y2,z2), and N(tn,xn,yn,zn) as sets of times when tracking information of a flying object is acquired by a user satellite B, a user satellite C, or a user satellite N after the detection of the flying object and position coordinates of the user satellites. In response to a demand to send flying object information to a plurality of different user satellites which fly close to (t1,x1,y1,z1), (t2,x2,y2,z2), and (tn,xn,yn,zn) after t0, the communication satellite business apparatus sequentially gives a communication instruction to communication satellites which fly close to (t1,x1,y1,z1), (t2,x2,y2,z2), and (tn,xn,yn,zn) after t0 such that the communication satellites transmit pieces of flying object information to the user satellites flying close to (t1,x1,y1,z1), (t2,x2,y2,z2), and (tn,xn,yn,zn).

<Tracking Transmission 4 in Communication Satellite Business Apparatus 410>

Figure 13:
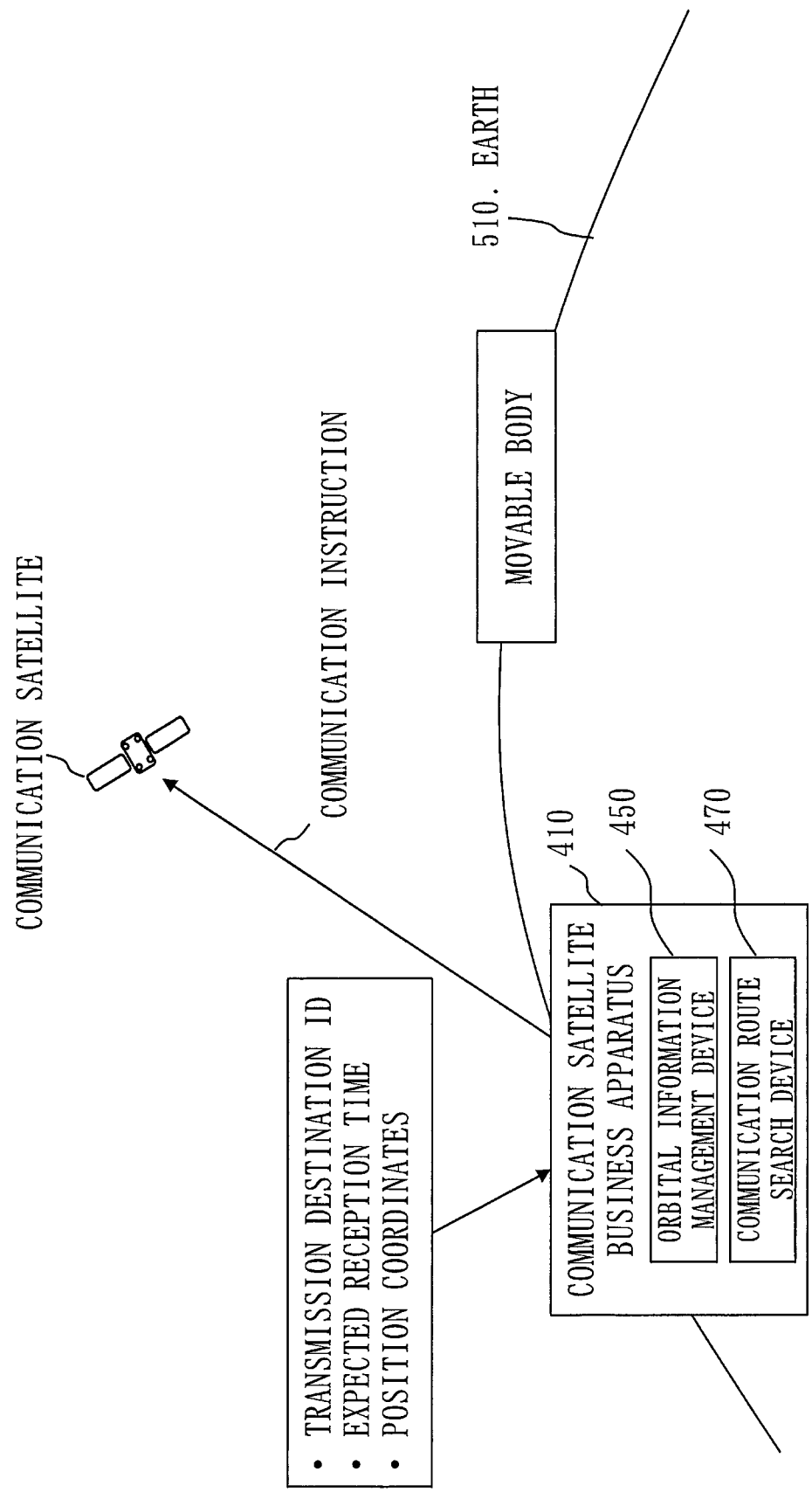
FIG. 13 is a diagram of Embodiment 1, illustrating tracking transmission.

FIG. 13 is a different diagram illustrating tracking transmission. Reference is made to FIG. 13. Assume that an information transmission destination is a land-sea-and-air movable body.

A user designates an ID of the movable body that is the transmission destination and an expected reception time for the movable body and position coordinates of the movable body at the expected reception time. The communication satellite business apparatus 410 uses the orbital information management device 450 and the communication route search device 470 to search for a route which passes through the communication satellite 200 that is to fly close to the position coordinates at the designated time and give a communication instruction to the communication satellite 200 such that the communication satellite 200 transmits information.

<Tracking Transmission 4 in Communication Satellite Business Apparatus 410>

Figure 14:
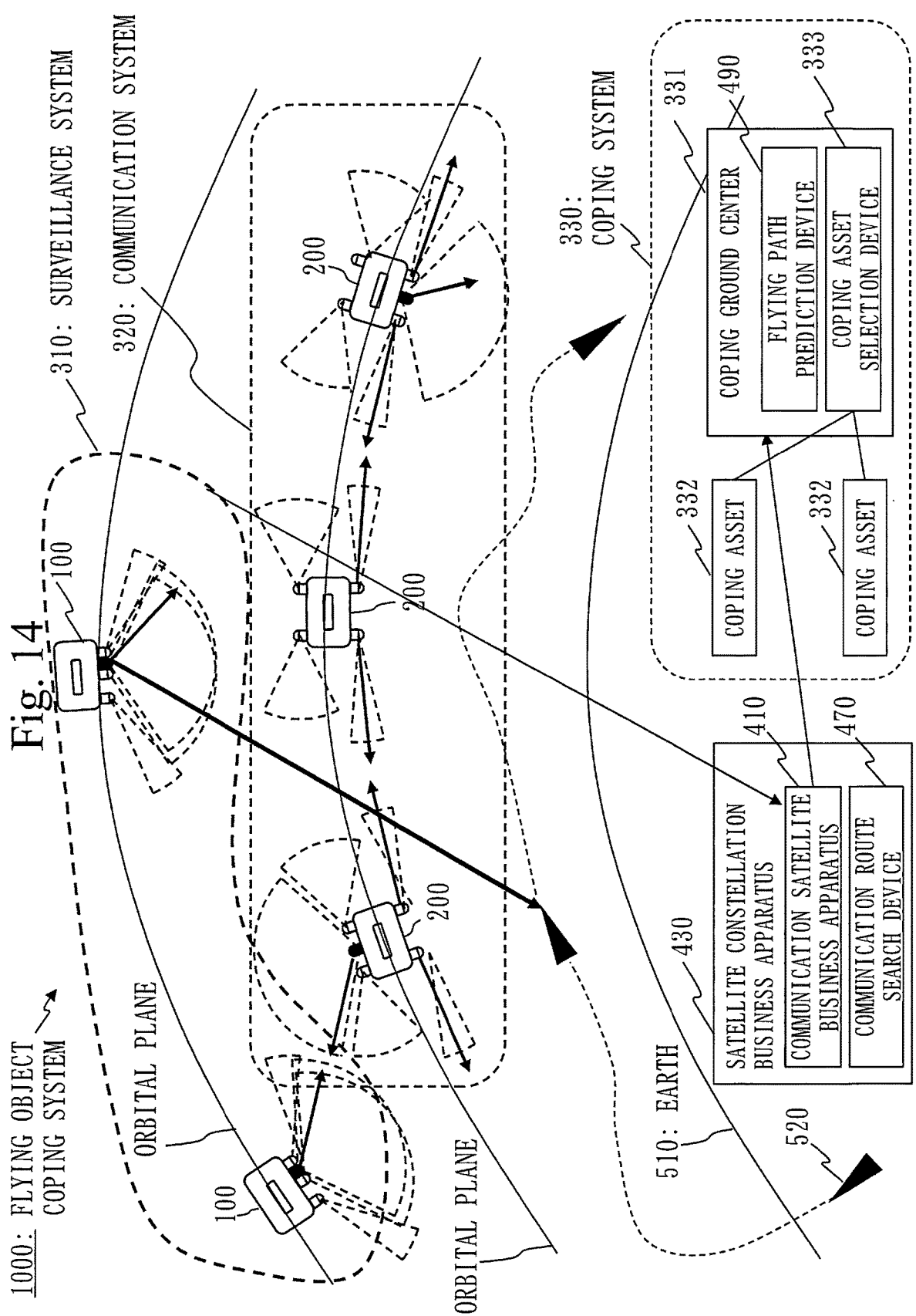
FIG. 14 is a diagram of Embodiment 1, illustrating tracking transmission.

FIG. 14 is a different diagram illustrating tracking transmission. Reference is made to FIG. 14. The flying object coping system 1000 includes the surveillance system 310 having a plurality of surveillance satellites 100, each including a surveillance device and a communication device, the communication system 320 having a plurality of communication satellites 200, each including a communication device, and the coping system 330 including the land-sea-and-air coping asset that copes with the flying object 520. The flying object coping system 1000 transmits flying object information generated through surveillance of a flying object by the surveillance system 310 to the coping system 330 via the communication system 320. The flying object information obtained by the surveillance system 310 is transmitted to the coping system via the communication satellite business apparatus 410.

<Communication Route Search Device 470>

Figure 15:
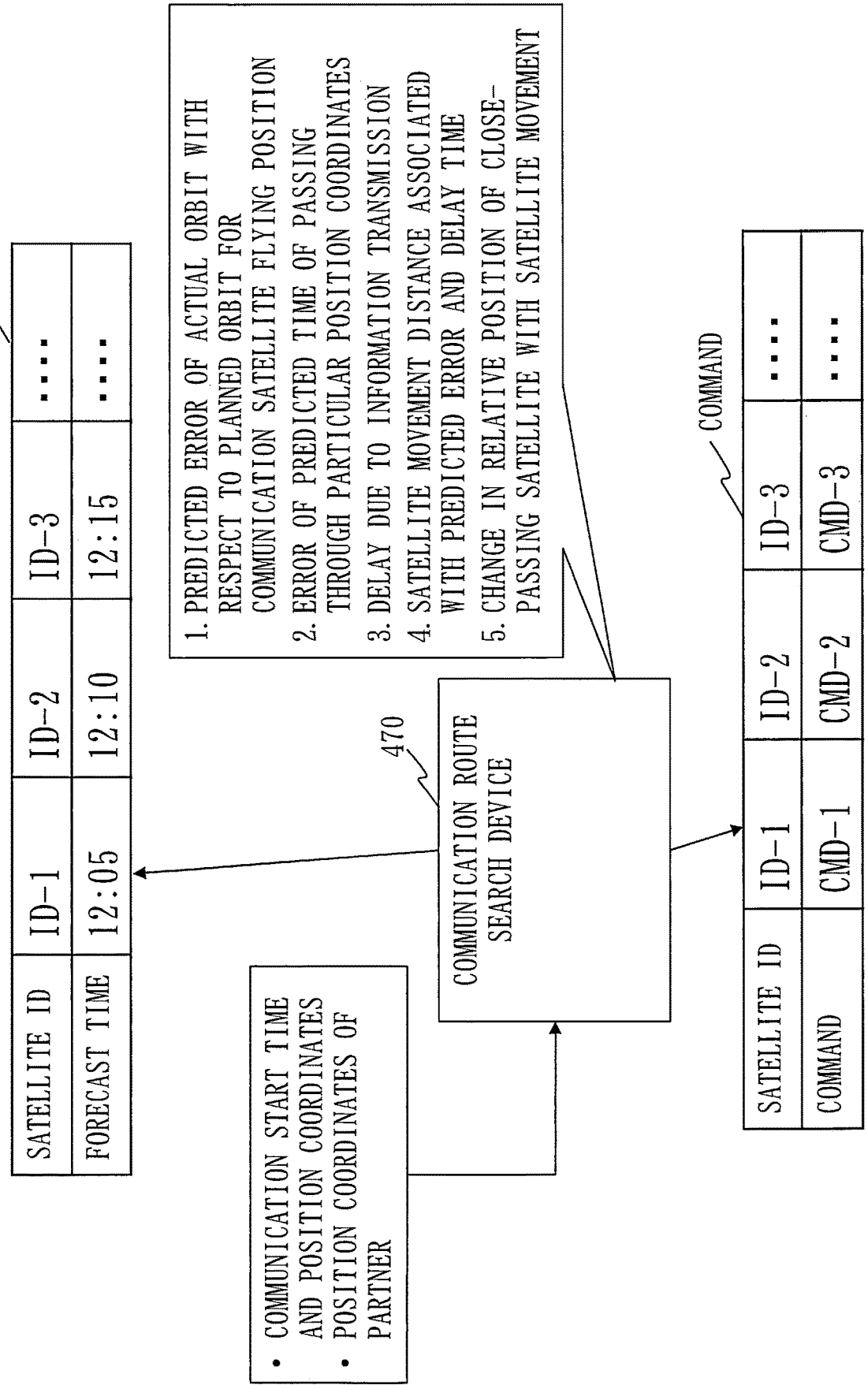
FIG. 15 is a diagram of Embodiment 1, illustrating a process by a communication route search device 470.

FIG. 15 illustrates a process by the communication route search device 470. Reference is made to FIG. 15. The communication route search device 470 sets a communication start time and position coordinates, and position coordinates of a partner to which flying object information is to be transmitted as input conditions. The communication route search device 470 searches for an optimum route obtained by linking satellite IDs for transmission of flying object information together and produces, as products, a list of a series of satellite IDs and forecast times when corresponding satellites are to transmit the flying object information to next satellites and a command which gives a communication instruction to a corresponding group of communication satellites. The communication route search device 470 includes, in analysis for a route search, the following (1) to (5):

(1) a predicted error of an actual orbit with respect to a planned orbit for a communication satellite flying position;
(2) an error of a predicted time of passing through particular position coordinates;
(3) a delay due to information transmission;
(4) a satellite movement distance associated with a predicted error and a delay time; and
(5) a change in a relative position of a close-passing satellite with satellite movement, and searches for the optimum route for transmission of the flying object information in a shortest time.

<Communication Route Search Device 470>

FIG. 16 illustrates a process by the communication route search device 470. Reference is made to FIG. 16. The communication route search device 470 regards a launching detection signal from the surveillance satellite 100 as a communication start instruction, sets position coordinates at launching detection of the surveillance satellite that is an emitter of the launching detection signal, position coordinates at which flying object launching is detected, and a visual field change range of the surveillance satellite as input conditions, searches for an optimum route obtained by linking satellite IDs for transmission of flying object information together, and produces, as products, a list of a series of satellite IDs and forecast times when corresponding satellites are to transmit the flying object information to next satellites and a command which gives a communication instruction to a corresponding group of communication satellites. The communication route search device 470 searches for an ID of a surveillance satellite passing close which is capable of performing surveillance close to a flying object launching point by including a visual field change and makes a search for a flying object information transmission time, a surveillance satellite ID, and an optimum route to transmission of the flying object information to a surveillance satellite with the surveillance satellite ID.

<Communication Route Search Device 470>

FIG. 17 illustrates a process by the communication route search device 470. Reference is made to FIG. 17. The communication route search device 470 regards a launching detection signal from a surveillance satellite as a communication start instruction and sets, as input conditions, position coordinates of the surveillance satellite that is an emitter of the launching detection signal, position coordinates at which flying object launching is detected, a visual field change range of the surveillance satellite, position coordinates of a surveillance satellite which is an emitter of a high-temperature sensing signal among close-passing surveillance satellites which are destinations of transmission of flying object information by the communication route search device 470, and position coordinates at which a high-temperature body is sensed. The communication route search device 470 searches for an optimum route obtained by linking satellite IDs for transmission of flying object information together, and produces, as products, a list of a series of satellite IDs and forecast times when corresponding satellites are to transmit the flying object information to next satellites and a command which gives a communication instruction to the corresponding group of communication satellites. The communication route search device 470 searches for an ID of a close-passing surveillance satellite which is capable of performing surveillance close to a high-temperature body sensing position by including a visual field change and makes a search for a flying object information transmission time, a surveillance satellite ID, and an optimum route to transmission of flying object information to the surveillance satellite ID.

<Flying Path Prediction Device 490>

FIG. 18 illustrates a process by a flying path prediction device 490. Reference is made to FIG. 18. In the flying object coping system 1000, if the surveillance satellite 100 including a plurality of surveillance devices detects a significant high-temperature object, the surveillance satellite 100 transmits, as flying object information, sensed sensing time information, a surveillance satellite ID, a surveillance device ID, and surveillance data to the coping ground center 331 via the communication system 320. The flying path prediction device 490 that the coping ground center 331 includes derives position information of the surveillance satellite with the ID at a sensing time in the flying object information, a forwarding direction, and a line of sight of a surveillance device with the ID, and extracts high-temperature object luminance from the surveillance data and derives an eye vector oriented to a high-temperature body.

<Flying Path Prediction Device 490>

Figure 19:
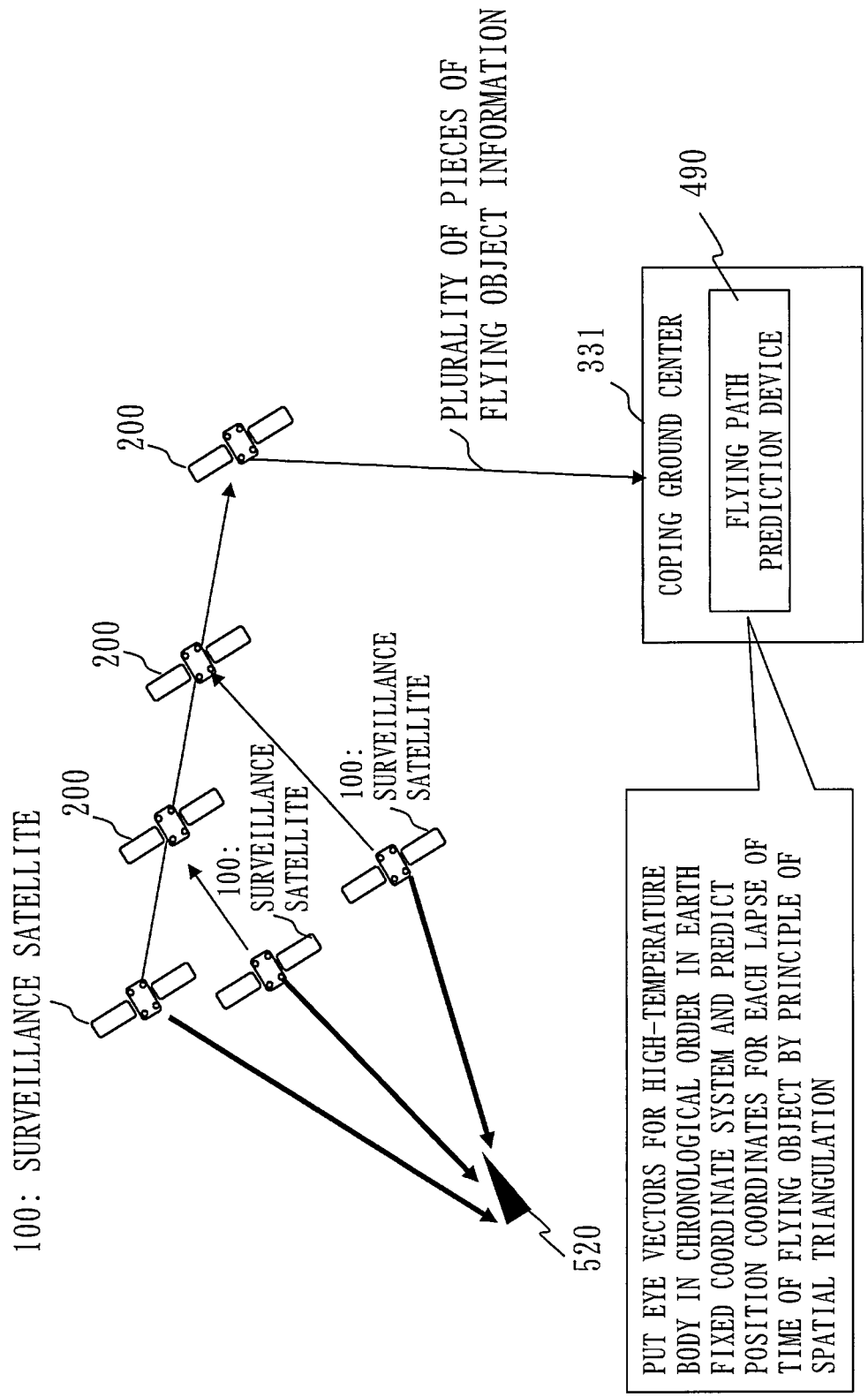
FIG. 19 is a diagram of Embodiment 1, illustrating a process by the flying path prediction device 490.

FIG. 19 illustrates a process by the flying path prediction device 490. Reference is made to FIG. 19. The flying path prediction device 490 that the coping ground center 331 includes puts eye vectors for a high-temperature body which are derived from pieces of flying object information from a plurality of surveillance satellites in chronological order in the earth fixed coordinate system and predicts position coordinates for each lapse of time of a flying object by the principle of spatial triangulation.

<Flying Path Prediction Device 490>

If a plurality of flying objects are launched at short intervals, the flying path prediction device 490 unifies pieces of flying object information acquired from a plurality of surveillance satellites 100 and judges that what is launched is a plurality of different flying objects.

<Flying Object Coping System 1000>

In the flying object coping system 1000 illustrated in FIG. 1, the surveillance system 310 includes a satellite constellation business apparatus having a group of six or more above-equator surveillance satellites which are equal in average orbital altitude and fly in above-equator orbits. Each in the group of above-equator surveillance satellites forms communication cross-links with ones of the above-equator surveillance satellites which fly ahead and behind on a same orbital plane. At least one of the above-equator surveillance satellites forms a communication cross-link with both the coping system 330 and the surveillance system 310 or either the coping system 330 or the surveillance system 310. In the flying object coping system 1000 illustrated in FIG. 1, transmission paths (or a transmission path) for transmission of flying object information to both the coping system 330 and the surveillance system 310 or either the coping system 330 or the surveillance system 310 may be constructed without intervention of the communication system 320.

<Above-Equator Satellite System>

The flying object coping system 1000 illustrated in FIG. 1 may have an above-equator satellite system which is composed of a group of six or more above-equator surveillance satellites equal in average orbital altitude and forms communication cross-links with ones of the above-equator satellites which fly ahead and behind and in which at least one of the above-equator satellites forms a communication cross-link with both the coping system and the surveillance system or either the coping system or the surveillance system and transmits flying object information to both the coping system and the surveillance system or either the coping system or the surveillance system.

<Above-Equator Satellite System>

The above-equator satellite system transmits flying object information to both the coping system 330 and the surveillance system 310 or either the coping system 330 or the surveillance system 310.

<Flying Object Coping System 1000>

In the flying object coping system 1000 illustrated in FIG. 1, the surveillance system 310 includes a satellite constellation business apparatus having a group of six or more polar orbit surveillance satellites which fly in polar orbits equal in average orbital altitude on a same orbital plane. Each in the group of polar orbit satellites forms communication cross-links with ones of the polar orbit satellites which fly ahead and behind, at least one of the polar orbit satellites forms a communication cross-link with both the coping system and the surveillance system or either the coping system or the surveillance system, and flying object information is transmitted to both the coping system and the surveillance system or either the coping system or the surveillance system without intervention of a satellite information transmission system.

<Polar Orbit Satellite System>

In the flying object coping system 1000 illustrated in FIG. 1, a polar orbit satellite system which is composed of a group of six or more polar orbit surveillance satellites equal in average orbital altitude on a same orbital plane and forms communication cross-links with ones of the polar orbit satellites which fly ahead and behind and in which at least one of the polar orbit satellite forms a communication cross-link with both the coping system and the surveillance system or either the coping system or the surveillance system and transmits flying object information to both the coping system and the surveillance system or either the coping system or the surveillance system may be used.

<Polar Orbit Satellite System>

The polar orbit satellite system transmits flying object information to both the coping system 330 and the surveillance system 310 or either the coping system 330 or the surveillance system 310.

<Polar Orbit Satellite System>

In the flying object coping system 1000 illustrated in FIG. 1, the surveillance satellite 100 includes a surveillance device and communication devices which are oriented forward and rearward. The surveillance satellite 100 flies at a same orbital altitude as the communication satellites 200 of the communication system 320 and between the communication satellite 200 and the communication satellite 200 on a same orbital plane. The surveillance satellite 100 forms communication cross-links with the communication satellites 200 ahead and behind and transmits flying object surveillance information to the coping system via the communication satellite business apparatus 410.

<Inclined Orbit Satellite System>

The flying object coping system 1000 illustrated in FIG. 1 is composed of a group of communication satellites which fly in inclined orbits and a plurality of surveillance satellites 100 in the communication satellite business apparatus 410. The surveillance satellite 100 includes a surveillance device and communication devices which are oriented forward and rearward. The surveillance satellite 100 flies at a same orbital altitude as the communication satellites 200 and between the communication satellite 200 and the communication satellite 200 on a same orbital plane and forms communication cross-links with the communication satellites 200 ahead and behind.

Advantageous Effects of Embodiment 1

The flying object coping system 1000 according to Embodiment 1 can transmit flying object information to a coping system in quasi-real time. The flying object coping system 1000 according to Embodiment 1 allows construction of a satellite constellation by a plurality of business operators and establishment of a mesh communication network. That is, in the flying object coping system 1000, determination of a satellite serving as a reference and an orbital plane serving as a reference allows relative control, and construction of a master-slave relationship between business operators allows construction of a satellite constellation by a plurality of business operators and establishment of a mesh communication network. A business operator serving as a master of satellite constellation operation desirably doubles as a master of a communication service business. If separate business operators are present, it is reasonable that a business operator including an "orbital information management device" serves as a master. If the other business operator holds a "communication route search device", the business operator including the "orbital information management device" preferably serves as a master and causes the slave business operator to make a route search.

Embodiment 2

Embodiment 2 will be described with reference to FIGS. 20 to 23. In Embodiment 2, a unified data library 340 having a database 341, a satellite constellation 610 which is a unified satellite constellation including an edge server 350 having the database 341, and an artificial intelligence computer 360 will be described.

<Unified Data Library 340>

Along with diversification of threats and diversification of a surveillance system, a communication system, and a coping system in recent years, there is a growing need for Joint All domain Command & Control (JADC2), in which various types of ground centers act using a common database.

A ground center may be read as a domain. Use of the commonly used database as a Unified Data Library (UDL) in a cloud environment or an edge computing environment allows sharing of information between the various types of ground centers. Additionally, a space data center concept based on satellite IoT has been proposed, and information can also be shared by a space data center.

Figure 20:
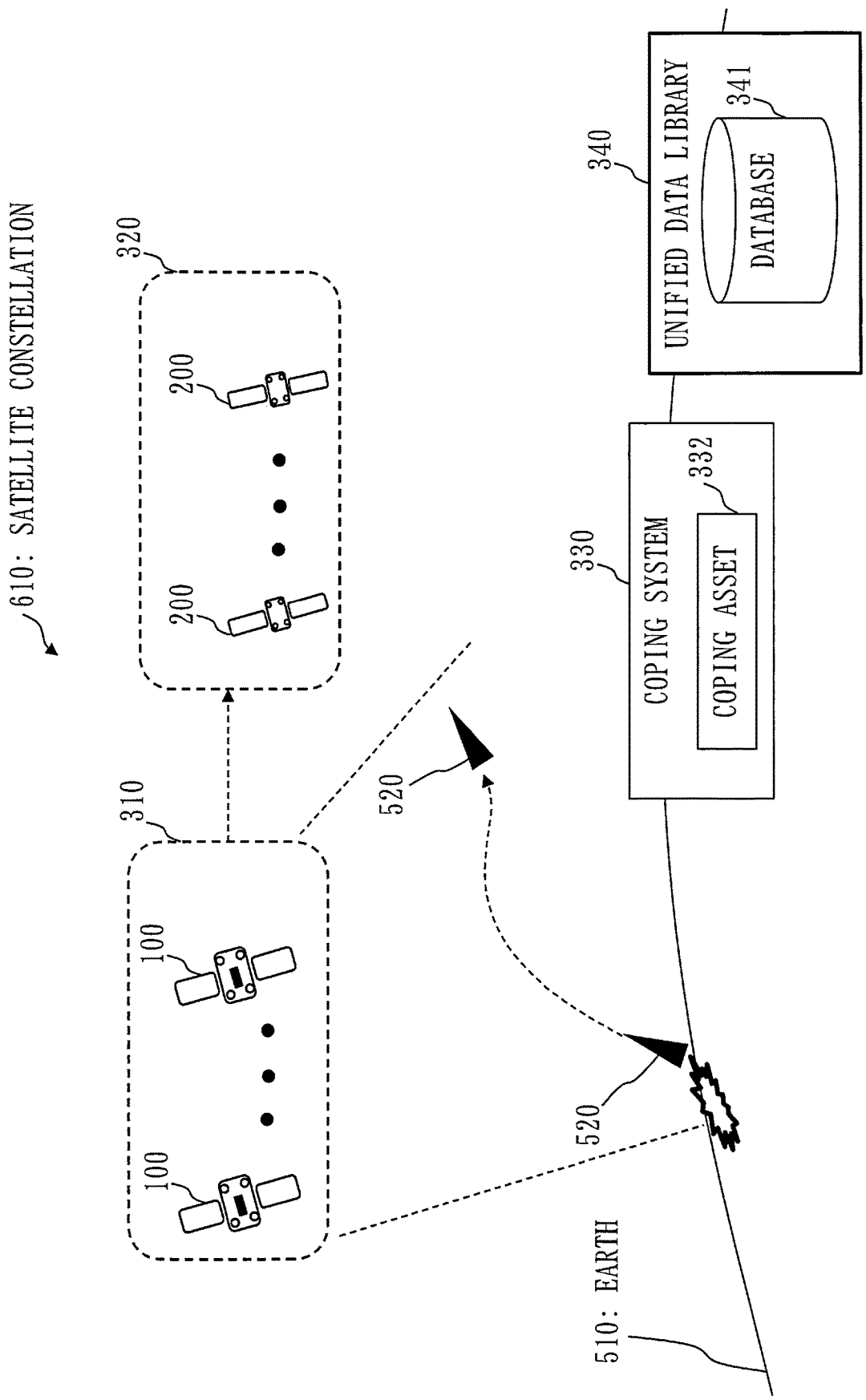
FIG. 20 is a diagram of Embodiment 2, illustrating arrangement of a unified data library.

FIG. 20 illustrates the satellite constellation 610 according to Embodiment 2.

The satellite constellation 610 that is a unified satellite constellation formed by the method for forming a unified satellite constellation according to Embodiment 1 includes a surveillance system 310 having a plurality of surveillance satellites 100 which send flying object information toward a coping system 330 and a communication system 320 which is a satellite information transmission system having a plurality of communication satellites 200 which transmit flying object information.

The satellite constellation 610 that is a unified satellite constellation formed by the method for forming a unified satellite constellation according to Embodiment 1 includes the surveillance system 310 having the plurality of surveillance satellites 100 that send flying object information generated through surveillance of a flying object toward the coping system 330 including a coping asset 332.

At least one system of the surveillance system 310, the communication system 320, and the coping system 330 refers to the unified data library 340.

Although the unified data library 340 is arranged on the ground as in FIG. 20, the unified data library 340 is arranged on a satellite.

As in FIG. 21 (to be described later), the unified data library 340 includes the database 341 that stores at least one of orbital information of the surveillance satellites 100, orbital information of the communication satellites 200, position information of the coping asset 332, and a plurality of flying path models for flying objects.

Here, the plurality of flying path models for flying objects are each a model which is constructed using launching position coordinates, a flying direction, a time-series flying distance from launching to impact, and a flying altitude profile of a flying object and is a model obtained by modeling a flying path.

Figure 21:
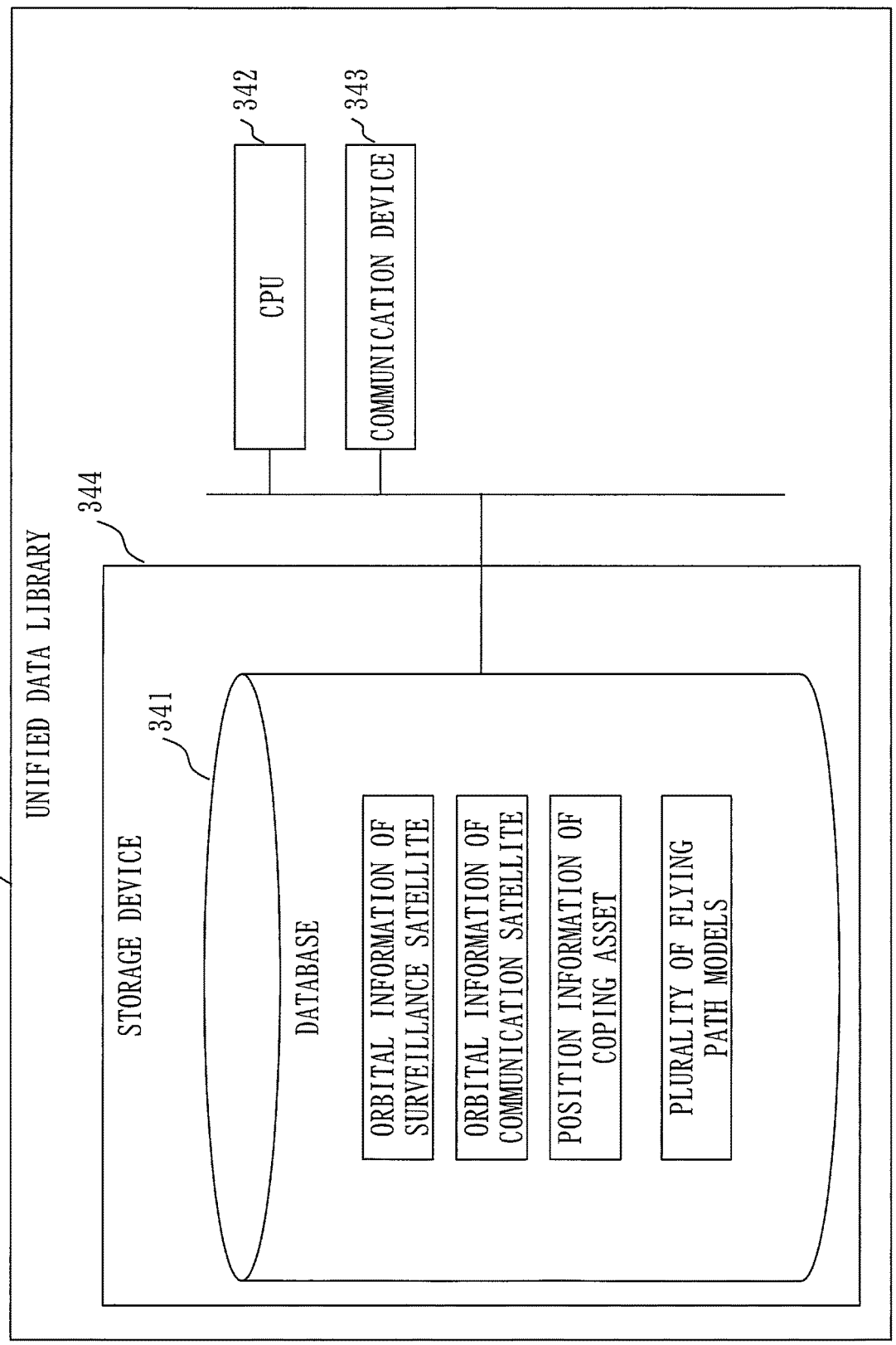
FIG. 21 is a diagram of Embodiment 2, illustrating a hardware configuration of the unified data library.

FIG. 21 illustrates a hardware configuration of the unified data library 340. The unified data library 340 is a computer. The unified data library 340 includes a CPU 342, a communication device 343, and a storage device 344. The storage device 344 implements the database 341.

<Cloud Computing: Satellite Equipped with Edge Server 350>

Along with increase in the amount of information associated with sophistication of the information society, increase in power consumption and measures against exhaust heat are problems. Increase in power and measures against exhaust heat of a supercomputer and a large-scale data center are serious problems especially for a centralized mechanism.

Meanwhile, in cosmic space, heat can be exhausted to deep space by radiational cooling. It is thus possible to arrange a supercomputer or a data center for implementation of a cloud environment on a satellite constellation side and transmit only necessary data to a user on the ground after arithmetic processing in an orbit. This maintains a cloud environment and reduces greenhouse gas emissions, which produces the effect of contributing to the SDGs on the ground.

<Edge Computing>

Edge computing in which an edge server is arranged on an IoT side is attracting attention as a technique for implementing distributed architecture.

In the conventional IoT, a centralized mechanism for sending data collected by a sensor to the cloud via the Internet and making an analysis is common. In contrast, in edge computing, a mechanism for dispersedly performing data processing by a device body or an edge server installed between a device and the cloud is adopted. This implements real-time, low-load data processing.

Along with increase in the amount of information associated with sophistication of the information society, increase in power consumption and measures against exhaust heat are problems. Increase in power and measures against exhaust heat of a supercomputer and a large-scale data center are serious problems especially for a centralized mechanism.

Meanwhile, in cosmic space, heat can be exhausted to deep space by radiational cooling. It is reasonable to use a satellite to resemble a device in the IoT, arrange an edge server on a satellite constellation side, and transmit only necessary data to the ground after distributed computing processing in an orbit. A hybrid constellation has the effect of exchanging information with the cloud including a data center in a ground facility 700 via an annular communication network or a mesh communication network and implementing low latency and collective management of data.

In FIG. 20, either at least one surveillance satellite 100 or at least one communication satellite 200 may be configured to include the edge server 350 having the database 341.

Figure 22:
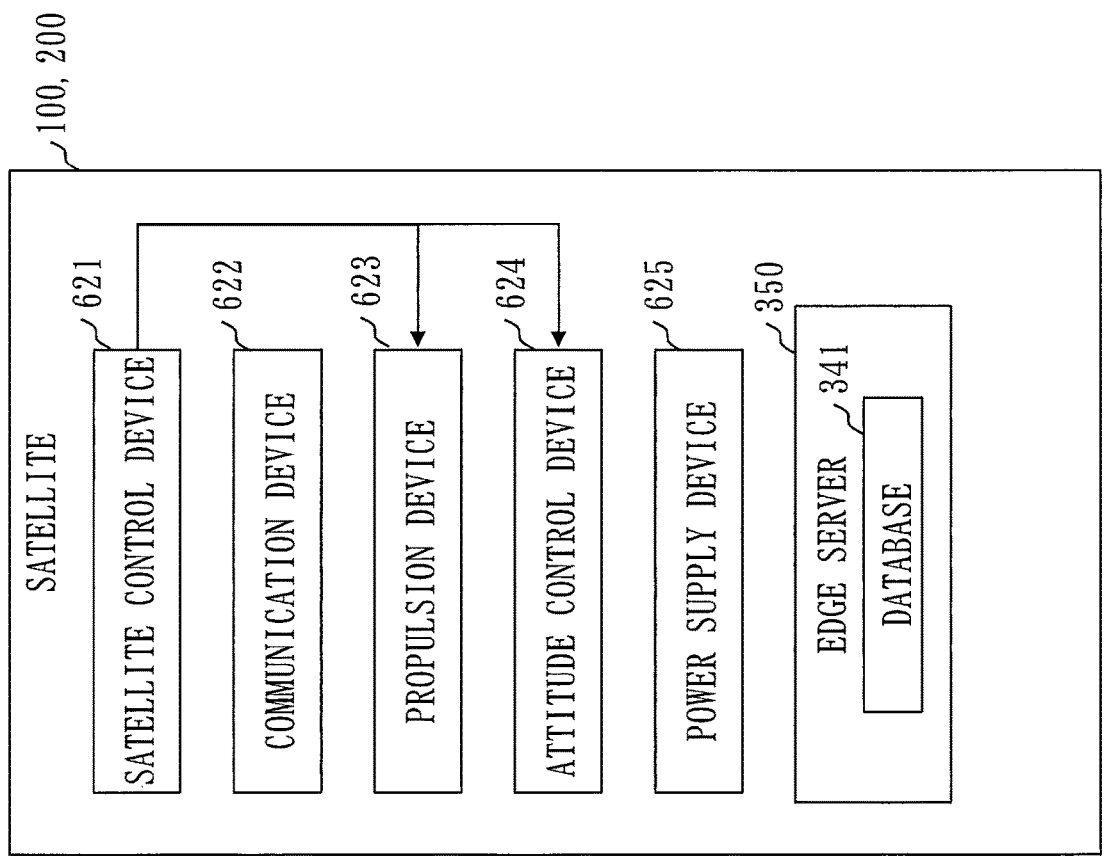
FIG. 22 is a diagram of Embodiment 2, illustrating a satellite equipped with an edge server.

FIG. 22 illustrates a configuration in which the surveillance satellite 100 or the communication satellite 200 is equipped with the edge server 350 having the database 341. Note that a surveillance device is not illustrated in FIG. 22. A hardware configuration of the edge server 350 is a same configuration as in the unified data library 340 in FIG. 21.

<Artificial Intelligence Computer>

Artificial intelligence will be described below. Artificial intelligence may also be referred to as AI.

A neural network of artificial intelligence is divided into supervised learning that is optimized for a problem through input of a teacher signal (correct answer) and unsupervised learning that requires no teacher signal.

Teaching of flying object types, propellant types, and a plurality of typical flying model patterns as a teacher model facilitates and speeds up inference about actual measurement data obtained by launching detection and acquisition of orbital information. As a result of inference, flying object path prediction and estimation of a landing position are performed.

Note that, to predict a flying path of a flying object, a flying direction of which is unknown in a launching detection stage, it is necessary to perform tracking surveillance over the flying object by a succeeding surveillance satellite. To send launching detection information to the succeeding surveillance satellite, the launching detection information needs to pass through a communication network formed by a group of communication satellites.

Since a communication satellite changes in flying position hour by hour in a communication network based on a communication satellite constellation, it is necessary to make an optimum communication route search and determine an ID of a communication satellite which is to give or receive flying object information and a sending and receiving time. The same applies to giving and receiving of flying object information of a surveillance satellite and a communication satellite.

If an optimum route search is made in a ground system, it is necessary to send, with commands, a time of giving and receiving of flying object information and a satellite ID to a surveillance satellite and a communication satellite. However, a communication network for command sending is a problem.

For the above-described reason, it is reasonable that a communication satellite includes an AI-based analysis device, makes an optimum route search in an orbit, and generates a command in the orbit and communicates the command to a communication satellite constituting a communication route.

As a technique for searching for an optimum route in an orbit, an optimum route search based on an algorithm known as the Dijkstra's algorithm is effective. Note that although route-by-route weighting does not change in the static Dijkstra's algorithm, a route-by-route weight changes for each time point with a change in a flying position of a communication satellite in a communication network formed by a communication satellite constellation. For this reason, an operation in which a communication satellite as a receiver of flying object information makes an optimum route search and sends the flying object information to a next communication satellite is repeated for each of individual communication satellites which make an optimum route search while updating orbital information.

Among route searches, breadth-first search and depth-first search are known. As for launching detection information, priority is given to speedy transmission of flying object information to a communication network by breadth-first search, and tracking is repeated by succeeding satellites. In a stage where a flying direction can be largely estimated, it is reasonable to make depth-first search.

In a flying object tracking system, tracking surveillance of a flying object is performed while repeating flying path prediction based on the above-described machine learning and a route search based on the Dijkstra's algorithm, and an inference about a final landing position is made.

Additionally, after repeating flying object tracking, machine learning is performed for a track record of past flying object tracking, and deep learning is performed for a case of a flying object operation different from a plurality of flying object models used as a teacher model. This allows enhancement of accuracy in prediction about a flying object path and speeding-up of prediction.

Since a flying direction and distance of a flying object which is not launched from a fixed launcher but is launched from a mobile launcher (TEL) or the like is different from a typical flying model, it is effective to complement an orbital model by deep learning on actual measurement data.

Figure 23:
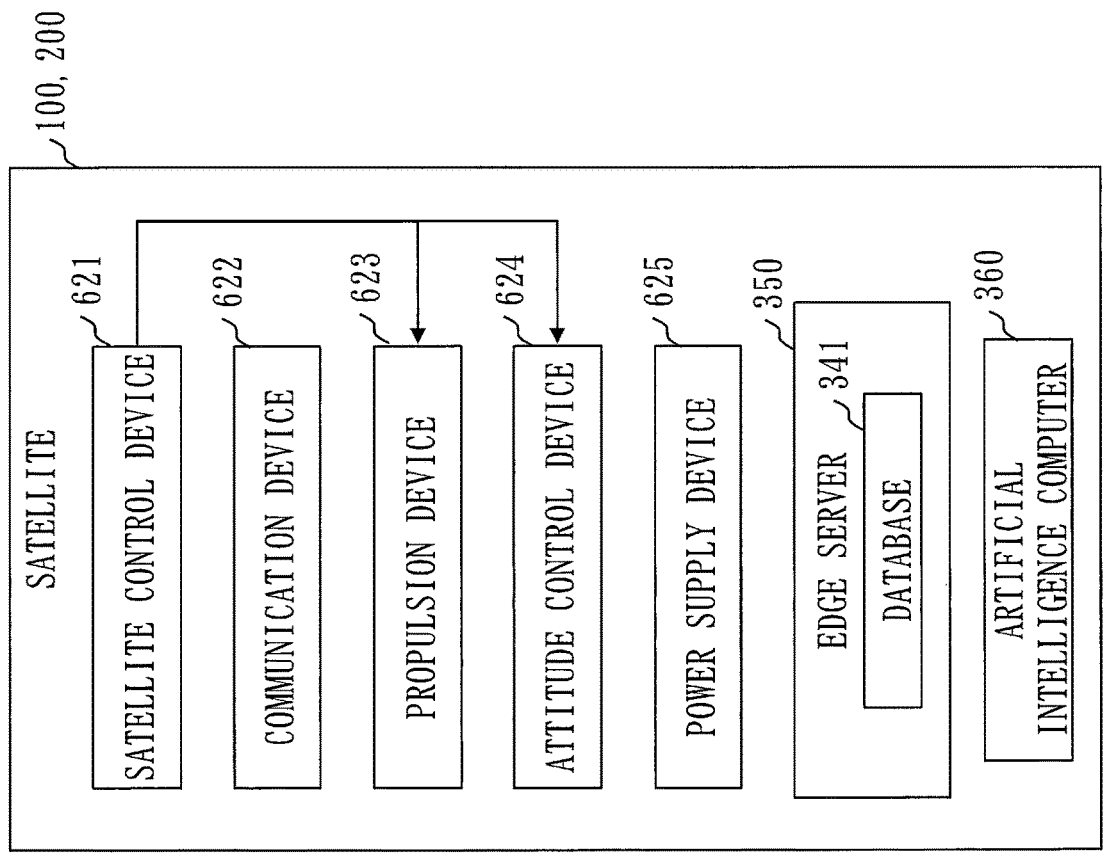
FIG. 23 is a diagram of Embodiment 2, illustrating a satellite equipped with an artificial intelligence computer.

FIG. 23 illustrates a configuration in which the surveillance satellite 100 or the communication satellite 200 includes the artificial intelligence computer 360. A satellite including the edge server 350 including the database 341 may be configured to include the artificial intelligence computer 360. The artificial intelligence computer 360 autonomously determines a flying object information transmission destination by referring to the database 341 and sends flying object information to the determined transmission destination. The artificial intelligence computer has the effect described in <Artificial Intelligence Computer> above.

REFERENCE SIGNS LIST

90: orbital plane; 100: surveillance satellite; 200: communication satellite; 310: surveillance system; 320: communication system; 330: coping system; 331: coping ground center; 332: coping asset; 333: coping asset selection device; 340: unified data library; 341: database; 350: edge server; 360: artificial intelligence computer; 410: communication satellite business apparatus; 430: satellite constellation business apparatus; 450: orbital information management device; 470: communication route search device; 490: flying path prediction device; 510: the earth; 520: flying object; 600: satellite constellation formation system; 610: satellite constellation; 620: satellite; 621: satellite control device; 622: communication device; 623: propulsion device; 624: attitude control device; 625: power supply device; 626: surveillance device; 700: ground facility; 910: processor; 911: satellite constellation formation unit; 921: memory; 922: auxiliary storage device; 930: input interface; 940: output interface; 950: communication device; 1000: flying object coping system

The invention claimed is:

1. A method for forming a unified satellite constellation serving as a one-piece communication medium, in which
a plurality of satellite constellation business apparatuses which manage individual satellite constellations, each having eight or more communication satellites on one orbital plane, are present,
all of the plurality of individual satellite constellations form the unified satellite constellation with eight or more orbital planes,
satellites on a same orbital plane each form inter-satellite cross-links with ones ahead and behind of the satellites,
satellites on adjacent orbital planes each form inter-satellite cross-links with ones in left and right adjacent orbits of the satellites,
the plurality of satellite constellation business apparatuses construct a total of N orbital planes and form a mesh communication network in collaboration, and
a communication satellite business apparatus which provides a communication service using the communication network as a communication medium performs unified control over the plurality of satellite constellation business apparatuses, the method comprising:
determining an orbital plane A serving as a representative among orbital planes with a largest number of communication satellites constituting each of the orbital planes;
determining a satellite constellation business apparatus A including the orbital plane A as a satellite constellation business apparatus serving as a representative;
determining a communication satellite A serving as a representative among communication satellites constituting the orbital plane A;
performing control such that an average orbital altitude and an average orbital inclination of all communication satellites constituting the communication satellite business apparatus are equal to an average orbital altitude and an average orbital inclination of the communication satellite A;
performing control such that angular distances between normal vectors of all orbital planes constituting the communication satellite business apparatus are equally spaced in a longitudinal direction with reference to a normal vector of the orbital plane A;
performing control such that in-orbital-plane phases of all the communication satellites constituting the orbital plane A are equally spaced with reference to the communication satellite A;
making in-orbital-plane phases of communication satellites for each of an orbital plane B to an orbital plane N other than the orbital plane A equivalent to the in-orbital-plane phases in the orbital plane A and, if the number of satellites on the orbital plane is insufficient, arranging a virtual satellite;
determining a communication satellite B to a communication satellite N serving as respective representatives for the orbital plane B to the orbital plane N other than the representative orbital plane A;
performing, by each of all the satellite constellation business apparatuses, control such that an average orbital altitude and an average orbital inclination of all satellites are equal to the average orbital altitude and the average orbital inclination of the communication satellite A; and
performing control such that ascending node passage times at the time of crossing of a sky above the equator from south to north for the communication satellite A to the communication satellite N have same time lags with reference to the communication satellite A.

2. The method for forming the unified satellite constellation according to claim 1, wherein
on a same orbital plane, the communication satellite A, the communication satellite B, and the communication satellite N serving as the representatives each establish cross-links with communication satellites which fly ahead and behind in the same orbital plane, and establish cross-links in order forward or rearward in a satellite forwarding direction and construct an annular cross-link in the same orbital plane,
between adjacent orbital planes, the representative communication satellite A of the orbital plane A serving as the representative establishes a cross-link with the representative communication satellite B of the adjacent orbital plane B, and the satellites that fly ahead of and behind the communication satellite A on the orbital plane A establish cross-links in order with respective communication satellites of the adjacent orbit plane B, and formation of cross-links with communication satellites of an adjacent orbital plane is repeated for each of the orbital plane B to the orbital plane N to construct an annular cross-link in the longitudinal direction.

3. The method for forming the unified satellite constellation according to claim 1, wherein the communication satellite business apparatus includes an orbital information management device, and the orbital information management device manages orbital information of the communication satellite A with high accuracy and high frequency, calculates flying position coordinates of the communication satellite A at a particular time in an earth fixed coordinate system, calculates flying position coordinates of communication satellites other than the communication satellite A at the particular time on the orbital plane A with reference to the position coordinates of the communication satellite A, calculates flying position coordinates at the particular time of the communication satellite B to the communication satellite N of the orbital plane B to the orbital plane N other than the orbital plane A with reference to the position coordinates of the communication satellite A, calculates IDs and flying position coordinates at the particular time of communication satellites other than the representative communication satellite on each of the orbital planes with reference to the position coordinates of the communication satellite A, and derives an ID of a communication satellite which flies close to designated position coordinates at an arbitrary time in a future.

4. The method for forming the unified satellite constellation according to claim 3, wherein the orbital information management device sets, as an I/O requirement, a time t0 serving as a sending starting point, position coordinates (x0,y0,z0) serving as a sending starting point, and position coordinates (xn,yn,zn) of a receiving asset user which are designated by a communication service user, and derives ID-1 of a communication satellite which flies close to (x0,y0,z0) at the time t0 and ID-N of a communication satellite which flies close to (xn,yn,zn) after a time lag until reception.

5. The method for forming the unified satellite constellation according to claim 1, wherein the communication satellite business apparatus includes a communication route search device, and the communication route search device sets, as an I/O requirement, a time t0 and position coordinates (x0,y0,z0) serving as sending starting points, and position coordinates (xn,yn,zn) of a receiving asset which are designated by a communication service user, and makes a search for a route with a shortest communication path from (x0,y0,z0) to (xn,yn,zn) at the time t0 and derives ID-1 to ID-N of communication satellites serving as the communication path.

6. The method for forming the unified satellite constellation according to claim 1, wherein the satellite constellation business apparatus A that is a representative of the satellite constellation business apparatuses includes an orbital information management device and a communication route search device, and the satellite constellation business apparatus A gives, to the other satellite constellation business apparatuses, a communication instruction to a satellite in a communication path for particular communication which is identified by a communication ID indicating the communication path.

7. The method for forming the unified satellite constellation according to claim 1, wherein the satellite constellation business apparatus A includes an orbital information management device, a satellite constellation business apparatus B which is different from the satellite constellation business apparatus A includes a communication route search device, the satellite constellation business apparatus A directs the satellite constellation business apparatus B to make a route search, and the satellite constellation business apparatus A gives a communication instruction to a communication ID serving as a communication path for particular communication for the other satellite constellation business apparatuses on the basis of a result of the search.

8. The method for forming the unified satellite constellation according to claim 1, wherein each of the communication satellites includes a communication device which makes inter-satellite communication with a user satellite which flies in cosmic space and transmits sending information of a user satellite designated by a user to a different user satellite or a ground facility designated by the user, using the communication device.

9. The method for forming the unified satellite constellation according to claim 8, wherein the unified satellite constellation includes a flying object surveillance satellite as each of the user satellites, and a user satellite A designates a time t0 serving as a starting point for sending of acquired information at the time of flying object launching detection, an ID of the user satellite A, position coordinates of the user satellite A, and position coordinates of a ground center as a transmission destination, and a communication route search device which the communication satellite business apparatus includes derives an optimum communication route and gives a communication instruction to a communication satellite serving as a communication path.

10. The method for forming the unified satellite constellation according to claim 8, wherein each of the user satellites is a flying object surveillance satellite, a user satellite A detects flying object launching and designates a detection time t0, position coordinates (x0,y0,z0) at which a flying object is detected, a time t1 serving as a starting point for sending of acquired information, and an ID and position coordinates of the user satellite A, and in response to a demand to send flying object information to a plurality of different user satellites which fly close to (x0,y0,z0) after t0, the communication satellite business apparatus gives a communication instruction to a communication satellite which flies close to (x0,y0,z0) after t0 such that the communication satellite transmits the flying object information to the user satellites flying close.

11. The method for forming the unified satellite constellation according to claim 8, wherein each of the user satellites is a flying object surveillance satellite, a user satellite A detects flying object launching, and designates a detection time t0, and (t1,x1,y1,z1), (t2,x2,y2,z2), and (tn,xn,yn,zn) as sets of times when tracking information of a flying object is acquired by a user satellite B, a user satellite C, or a user satellite N after the detection of the flying object and position coordinates of the user satellites, and in response to a demand to send flying object information to a plurality of different user satellites which fly close to (t1,x1,y1,z1), (t2,x2,y2,z2), and (tn,xn,yn,zn) after t0, the communication satellite business apparatus sequentially gives a communication instruction to communication satellites which fly close to (t1,x1,y1,z1), (t2,x2, y2,z2), and (tn,xn,yn,zn) after t0 such that the communication satellites transmit the flying object information to the user satellites flying close to (t1,x1, y1,z1), (t2,x2,y2,z2), and (tn,xn,yn,zn).

12. The method for forming the unified satellite constellation according to claim 8, wherein an information transmission destination is a land-sea-and-air movable body, a user designates an ID of the movable body that is the transmission destination, and an expected reception time for the movable body and position coordinates of the movable body at the expected reception time, and a communication satellite business apparatus uses an orbital information management device and a communication route search device to search for a route which passes through a communication satellite which is to fly close to the position coordinates at the designated time and give a communication instruction to the communication satellite such that the communication satellite transmits information.

13. The method for forming the unified satellite constellation according to claim 1, wherein the unified satellite constellation includes a surveillance system having a plurality of surveillance satellites, each including a surveillance device and a communication device, and flying object information generated through surveillance of a flying object by the surveillance system is transmitted to a coping system which includes a land-sea-and-air asset via the communication satellite business apparatus.

14. The method for forming the unified satellite constellation according to claim 1, wherein the unified satellite constellation includes a communication route search device which sets a communication start time and position coordinates, and position coordinates of a partner to which flying object information is to be transmitted as input conditions, searches for an optimum route obtained by linking satellite IDs for transmission of the flying object information together, and produces, as products, a list of a series of satellite IDs and forecast times when satellites are to transmit the flying object information to next satellites and a command which gives a communication instruction to a group of communication satellites, and the communication route search device includes, in analysis for a route search, a predicted error of an actual orbit from a planned orbit for a communication satellite flying position, an error of a predicted time of passing through particular position coordinates, a delay due to information transmission, a satellite movement distance associated with the predicted error and a delay time, and a change in a relative position of a close-passing satellite with satellite movement, and searches for the optimum route for transmission of the flying object information in a shortest time.

15. The method for forming the unified satellite constellation according to claim 1, wherein the unified satellite constellation includes a communication route search device, the communication route search device regards a launching detection signal from a surveillance satellite as a communication start instruction, sets, as input conditions, position coordinates at launching detection of the surveillance satellite that is an emitter of the launching detection signal, position coordinates at which flying object launching is detected, and a visual field change range of the surveillance satellite, searches for an optimum route obtained by linking satellite IDs for transmission of flying object information together, produces, as products, a list of a series of satellite IDs and forecast times when satellites are to transmit the flying object information to next satellites and a command which gives a communication instruction to a group of communication satellites, and searches for an ID of a surveillance satellite passing close which is capable of performing surveillance close to a flying object launching point by including a visual field change and makes a search for a flying object information transmission time, a surveillance satellite ID, and an optimum route to transmission of the flying object information to a surveillance satellite with the surveillance satellite ID.

16. The method for forming the unified satellite constellation according to claim 1, wherein the unified satellite constellation includes a communication route search device, and the communication route search device regards a launching detection signal from a surveillance satellite as a communication start instruction, sets position coordinates of the surveillance satellite that is an emitter of the launching detection signal, position coordinates at which flying object launching is detected, a visual field change range of the surveillance satellite, position coordinates of a surveillance satellite which is an emitter of a high-temperature sensing signal among close-passing surveillance satellites which are destinations of past transmission of flying object information, and position coordinates at which a high-temperature body is sensed as input conditions, searches for an optimum route obtained by linking satellite IDs for transmission of the flying object information together, and produces, as products, a list of a series of satellite IDs and forecast times when satellites are to transmit the flying object information to next satellites and a command which gives a communication instruction to a group of communication satellites, and searches for an ID of a close-passing surveillance satellite which is capable of performing surveillance close to a high-temperature body sensing position by including a visual field change and makes a search for a flying object information transmission time, a surveillance satellite ID, and an optimum route to transmission of the flying object information to the surveillance satellite ID.

17. The method for forming the unified satellite constellation according to claim 13, wherein the unified satellite constellation includes a surveillance satellite including a plurality of surveillance devices, the surveillance satellite transmits, as flying object information, sensed sensing time information, a surveillance satellite ID, a surveillance device ID, and surveillance data to a coping ground center via a communication system if the surveillance satellite detects a significant high-temperature object, and a flying path prediction device which the coping ground center includes derives position information of the surveillance satellite with the ID at a sensing time in the flying object information, a forwarding direction, and a line of sight of a surveillance device with the ID, and extracts high-temperature object luminance from the surveillance data and derives an eye vector oriented to a high-temperature body.

18. The method for forming the unified satellite constellation according to claim 17, wherein the flying path prediction device that the coping ground center includes puts eye vectors for the high-temperature body which are derived from pieces of flying object information from a plurality of surveillance satellites in chronological order in an earth fixed coordinate system and predicts position coordinates for each lapse of time of a flying object by a principle of spatial triangulation.

19. The method for forming the unified satellite constellation according to claim 17, wherein if a plurality of flying objects are launched at short intervals, pieces of flying object information which are obtained from a plurality of surveillance satellites are unified, and it is judged that the flying objects, paths for which are predicted by the flying path prediction device, are a plurality of different flying objects.

20. The method for forming the unified satellite constellation according to claim 13, wherein the surveillance system includes a satellite constellation business apparatus having a group of six or more above-equator surveillance satellites which are equal in average orbital altitude and fly in an above-equator orbit, each in the group of above-equator surveillance satellites forms communication cross-links with ones of the above-equator satellites which fly ahead and behind on a same orbital plane, at least one of the above-equator satellites forms a communication cross-link with both the coping system and the surveillance system or either the coping system or the surveillance system, and flying object information is transmitted to both the coping system and the surveillance system or either the coping system or the surveillance system without intervention of a satellite information transmission system.

21. The method for forming the unified satellite constellation according to claim 13, wherein the unified satellite constellation is composed of a group of six or more above-equator surveillance satellites equal in average orbital altitude, communication cross-links with ones of the above-equator satellites which fly ahead and behind are formed, at least one of the above-equator satellites forms a communication cross-link with both the coping system and the surveillance system or either the coping system or the surveillance system, and flying object information is transmitted to both the coping system and the surveillance system or either the coping system or the surveillance system.

22. The method for forming the unified satellite constellation according to claim 21, wherein the group of above-equator surveillance satellites transmits the flying object information to at least one system of the coping system and the surveillance system.

23. The method for forming the unified satellite constellation according to claim 13, wherein the surveillance system includes a satellite constellation business apparatus having a group of six or more polar orbit surveillance satellites which fly in polar orbits equal in average orbital altitude on a same orbital plane, and each in the group of polar orbit surveillance satellites forms communication cross-links with ones of the polar orbit satellites which fly ahead and behind, and at least one of the polar orbit satellites forms a communication cross-link with both the coping system and the surveillance system or either the coping system or the surveillance system and transmits flying object information to both the coping system and the surveillance system or either the coping system or the surveillance system without intervention of a satellite information transmission system.

24. The method for forming the unified satellite constellation according to claim 13, wherein the unified satellite constellation is composed of a group of six or more polar orbit surveillance satellites equal in average orbital altitude on a same orbital plane, communication cross-links with ones of the polar orbit satellites which fly ahead and behind are formed, at least one of the polar orbit satellites forms a communication cross-link with both the coping system and the surveillance system or either the coping system or the surveillance system, and flying object information is transmitted to both the coping system and the surveillance system or either the coping system or the surveillance system.

25. The method for forming the unified satellite constellation according to claim 13, wherein each of the surveillance satellites includes a surveillance device and communication devices which are oriented forward and rearward, flies at a same orbital altitude as the communication satellites and between communication satellites on a same orbital plane, forms communication cross-links with communication satellites ahead and behind, and transmits flying object surveillance information to the coping system via the communication satellite business apparatus.

26. The method for forming the unified satellite constellation according to claim 13, wherein the unified satellite constellation has an inclined orbit satellite system which is composed of a group of communication satellites which fly in inclined orbits and a plurality of surveillance satellites in the communication satellite business apparatus, and in which each of the surveillance satellites includes a surveillance device and communication devices which are oriented forward and rearward, and flies at a same orbital altitude as the communication satellites and between communication satellites on a same orbital plane and forms communication cross-links with communication satellites ahead and behind.

27. A unified data library, wherein a unified satellite constellation formed by the method for forming a unified satellite constellation according to claim 1 includes a surveillance system having a plurality of surveillance satellites which send flying object information generated through surveillance of a flying object toward a coping system which includes a coping asset, and a satellite information transmission system having a plurality of communication satellites which transmit the flying object information, the unified data library is a library which is referred to by at least one system of the surveillance system, the satellite information transmission system, and the coping system, and the unified data library is a library which includes a database storing at least one of orbital information of the surveillance satellites, orbital information of the communication satellites, position information of the coping asset, and a plurality of flying path models which are each a model constructed using launching position coordinates, a flying direction, a time-series flying distance from launching to impact, and a flying altitude profile of the flying object and a model obtained by modeling a flying path.

28. A unified satellite constellation formed by the method for forming a unified satellite constellation according to claim 1, comprising a surveillance system having a plurality of surveillance satellites which send flying object information generated through surveillance of a flying object toward a coping system which includes a coping asset, wherein either at least one of the surveillance satellites or at least one of the communication satellites includes an edge server which includes a database storing at least one of orbital information of the surveillance satellites, orbital information of the communication satellites, position information of the coping asset, and a plurality of flying path models which are each a model constructed using launching position coordinates, a flying direction, a time-series flying distance from launching to impact, and a flying altitude profile of the flying object and a model obtained by modeling a flying path.

29. The unified satellite constellation according to claim 28, wherein the satellite including the edge server including the database includes an artificial intelligence computer which autonomously determines a transmission destination of the flying object information by referring to the database and sends the flying object information to the determined transmission destination.

\* \* \* \* \*